(12) United States Patent
Ko

(10) Patent No.: US 10,583,887 B2
(45) Date of Patent: Mar. 10, 2020

(54) FOLDABLE KICK BOARD

(71) Applicant: Young Seung Ko, Yongin-si (KR)

(72) Inventor: Young Seung Ko, Yongin-si (KR)

(*) Notice: Subject to any disclaimer, the term of this patent is extended or adjusted under 35 U.S.C. 154(b) by 0 days.

(21) Appl. No.: 15/760,632

(22) PCT Filed: Aug. 2, 2016

(86) PCT No.: PCT/KR2016/008530
§ 371 (c)(1),
(2) Date: Mar. 16, 2018

(87) PCT Pub. No.: WO2017/047927
PCT Pub. Date: Mar. 23, 2017

(65) Prior Publication Data
US 2018/0257733 A1  Sep. 13, 2018

(30) Foreign Application Priority Data

Sep. 7, 2015 (KR) .................. 10-2015-0131937
Apr. 29, 2016 (KR) .................. 10-2016-0053583

(51) Int. Cl.
| B62K 15/00 | (2006.01) |
| B62K 21/16 | (2006.01) |
| B62K 17/00 | (2006.01) |
| B62K 21/22 | (2006.01) |
| B62K 3/00 | (2006.01) |

(52) U.S. Cl.
CPC ............ B62K 15/006 (2013.01); B62K 3/002 (2013.01); B62K 15/00 (2013.01); B62K 17/00 (2013.01); B62K 21/16 (2013.01); B62K 21/22 (2013.01)

(58) Field of Classification Search
CPC ...... B62K 15/006; B62K 15/00; B62K 3/002; B62K 17/00; B62K 21/16; B62K 21/22
USPC ........................................ 280/87.05
See application file for complete search history.

(56) References Cited

U.S. PATENT DOCUMENTS

| 7,976,035 B2 * | 7/2011 | Chan ............... B62K 15/00 280/87.05 |
| 8,720,918 B2 * | 5/2014 | Liao ............... B62K 15/006 280/287 |
| 2004/0145141 A1 | 7/2004 | Dennis |
| 2009/0278327 A1 | 11/2009 | Chan |

FOREIGN PATENT DOCUMENTS

| KR | 10-1998-0000520 A | 3/1998 |
| KR | 20-0180860 Y1 | 5/2000 |
| KR | 20-0204403 Y1 | 11/2000 |
| KR | 20-0219854 Y1 | 4/2001 |
| KR | 10-2010-0111449 A | 10/2010 |
| KR | 10-2014-0107009 A | 9/2014 |
| KR | 10-2015-0072267 A | 6/2015 |

OTHER PUBLICATIONS

International Search Report for PCT/KR2016/008530 dated Dec. 6, 2016 from Korean Intellectual Property Office.

* cited by examiner

*Primary Examiner* — John D Walters
(74) *Attorney, Agent, or Firm* — Revolution IP, PLLC

(57) ABSTRACT

The present invention relates to a foldable kick board in which a footboard can be folded in two stages and the length of a handle shaft can be freely adjusted such that the size of the full-folded kick board can be reduced to be same as the length of the footboard.

5 Claims, 28 Drawing Sheets

FOLDABLE KICK BOARD

TECHNICAL FIELD

The present invention relates to a foldable kick board in which a footboard can be folded in two stages and the length of a handle shaft can be freely adjusted such that the size of the full-folded kick board can be reduced to be same as the length of the footboard.

BACKGROUND ART

Generally, a kick board which children enjoy play while riding has an outer wheel provided on the front and an auxiliary wheel provided on a rear footboard and is driven by the other foot when a foot is placed on the rear footboard while the front outer wheel is operated by a handle to enjoy riding and speed.

Meanwhile, since the configuration of the kick board is a well-known technique, the detailed description will be omitted, and in addition, the kick board is described in detail in Korean Patent Registration No. 98-520 (Mechanical three-wheeled scooter) and Korean Utility Model Registration No. 180860 (Two-wheeled car).

However, in the kick board having the above configuration, since the handle is not folded but always faces up, a volume is increased at the time of storage or carrying, and thus, there is a disadvantage in that the kick board occupies a large space and is difficult to be carried by, specifically, the children.

Further, when the aforementioned kick board moves, since the handle protrudes as it is, the handle is crashed against objects placed around, and thus the objects are damaged or the handle is damaged.

FIG. 31 is a diagram illustrating a foldable kick board in the related art.

A configuration of the foldable kick board in the related art includes a general handle 100, and the handle 100 is inserted into a handle stem 102 to move up/down and a general wheel 104 is assembled at an end portion of the handle stem 102. Further, a C-shaped frame is welded and fixed to a lower rear side of the handle stem 102, a square hole 12 is formed in the upper surface of the frame, and rectangular long holes 16 are formed at both sides. Meanwhile, a hinge hole 14 is formed at the upper side of the long hole 16 and a shaft 28 for assembling a lever 18 is inserted into the hinge hole 14.

The lever 18 has a handle 20 knurled on the surface, the handle 20 has an extension 22 extending downward, and a coupling hole 24 for inserting the aforementioned shaft is formed at the end portion of the extension 22.

Further, at the end portion of the coupling hole 24, an engaging portion 26 rounded counterclockwise is integrally formed so that a stopper 30 bent forward is seated.

Meanwhile, the lever 18 having the configuration is inserted into the square hole 12 of the frame 10 and assembled and rotated in the frame 10 by the shaft 28. In this case, the aforementioned stopper 30 is seated on the engaging portion 26 of the lever 18 and moves along the long hole 16 of the frame 10.

A hinge hole 17 is formed at the lower end of the frame 10 and serves as a medium for connecting the handle stem 102 of the handle 100 and a board 108.

The board 108 is flatly made so that one foot may be placed thereon, a wheel 110 is attached to the rear end portion thereof, and a brake fender 112 is provided in the wheel 110. In this case, a brake (not illustrated) is provided in the brake fender 112. Meanwhile, such a configuration is a well-known technique.

Fan-shaped plates are spaced apart from each other at predetermined intervals on an upper surface of the aforementioned board 108, and first and second fixing grooves 42a and 42b are formed on a circumferential surface of each plate, respectively.

In this case, the first and second fixing grooves 40 and 42 are deeply formed in a central direction of the plate 36, preferably, the central direction of the fan shape, and the aforementioned stopper 30 is engaged with the first and second fixing grooves 40 and 42. That is, if the stopper 30 is inserted into first fixing grooves 40a and 40b, the handle 100 is maintained to be extended upward, and on the contrary, if the stopper 30 is inserted into second fixing grooves 42a and 42b, the handle 100 is maintained to be in close contact with the board 108 and folded.

Finally, hinge holes 38a and 38b are formed in the centers of the aforementioned plates 36a and 36b, and the shaft 34 is inserted into the hinge holes 38a and 38b and the hinge hole 17 of the aforementioned frame 10, and as a result, the frame 10 is assembled in the plate 36 and rotated. Meanwhile, the aforementioned stopper 30 and the shaft 34 are connected to each other by receiving tension by a spring 32, and preferably, the stopper 30 is coupled to a hook 32a of the spring 32 and the shaft 34 is coupled to a hook 32b to be pulled toward the spring 32 by receiving elasticity.

In a prior art of the foldable kick board according to the present invention, there is disclosed a folding portion structure of a steering pole of a kick board (registered date: Apr. 16, 2001) in Korean Utility Model Registration No. 20-0219854. As another prior art, there is disclosed a foldable kick board (registered date: Nov. 15, 2000) in Korean Utility Model Registration No. 20-0204403.

DISCLOSURE

Technical Problem

Therefore, an object of the present invention to solve the aforementioned problems is to provide a foldable kick board capable of simply folding, storing, and moving a kick board.

Technical Solution

In order to achieve the object, according to an aspect of the present invention, there is provided a foldable kick board in which a handle shaft portion for holding a handle portion is folded while a user places a foot on a footboard, wherein the handle shaft portion is folded in two stages.

The handle shaft portion may include a first upper unit and a first lower unit configured to rotate while one ends thereof are connected to each other; and a second upper unit and a second lower unit which are inserted into the first upper unit and the first lower unit to slide, respectively.

The footboard portion may be configured by a foot front and a footboard which are connected to each other so that connected portions may rotate.

Locking shafts may be provided at the bottoms of the foot front and the footboard, and when the locking shafts simultaneously fix the bottoms of the foot front and the footboard, the foot front and the footboard are not rotated to each other.

According to another aspect of the present invention, there is provided a foldable kick board including: a footboard on which a user's foot is placed; a body portion provided with a front wheel and connected with the footboard; a handle shaft portion connected with the body portion; and a handle portion configured at an upper end of the handle shaft portion to be held by both hands of the user, in which the handle shaft portion may include a first lower unit and a second lower unit configured to rotate while one ends thereof are connected to each other; and a first upper unit and a second upper unit which are inserted into the first lower unit and the second lower unit to slide in a vertical direction, respectively.

A first locking band and a second locking band which are separated from each other may be provided at upper sides of the first lower unit and the second lower unit, and when all of the first upper unit and the second upper unit are slidably inserted into the first lower unit and the second lower unit, the first locking band and the second locking band may be separated from each other so that height positions are different from each other.

Advantageous Effects

As described above, according to the foldable kick board of the present invention, a handle shaft bar of the kick board is divided into two separate units such that the length thereof may be adjusted while the two units slide, respectively, and constituted to be folded, and the footboard is also constituted to be fully folded in two stages such that the length of the kick board is almost the same as the length of the footboard. As a result, the foldable kick board has an advantage of allowing a user to easily store the kick board and conveniently move the kick board at the time of moving.

Further, the length of the handle shaft bar is easily adjusted so that the kick board can be enjoyed regardless of the age of the user.

DESCRIPTION OF REFERENCE NUMERALS OF PRIMARY PARTS IN DRAWINGS

Figure 1:
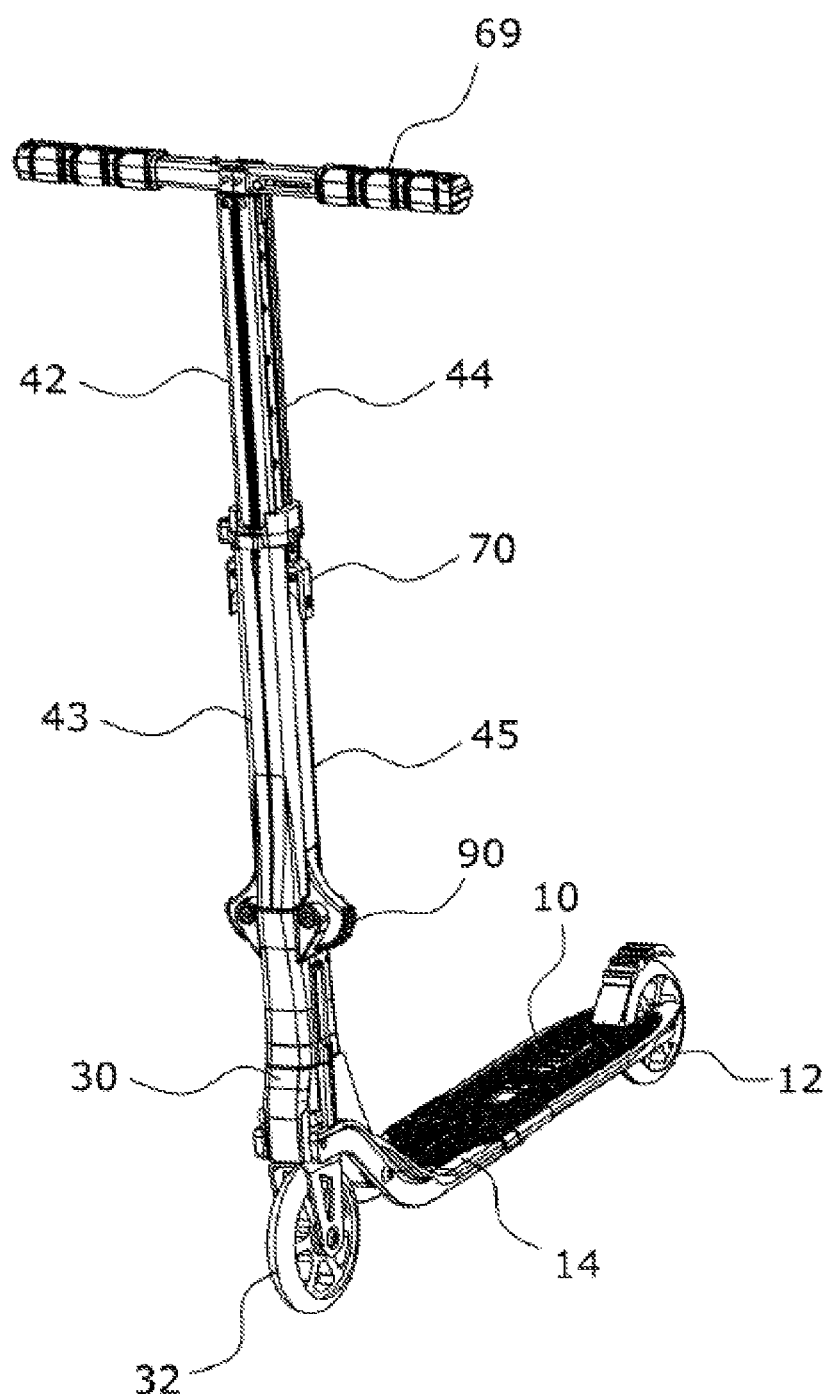
FIG. 1 is a perspective view of a foldable kick board according to the present invention.

10: Footboard
14: Foot front
15: Locking body
16: Protrusion
17: Locking protrusion
19: Locking hole
20: Right-triangular portion
21: Coil spring
30: Body portion
36, 37: Rotational shaft
42: First upper unit
43: First lower unit
44: Second upper unit
45: Second lower unit
46: Stopping groove
70: Stopping lever
72: Stopping rod
80: First locking band
82: Second locking band
81, 83: Hook-shaped end portion
84: Locking lever
85: Tightening protrusion
86: Upper cover
88: Coil spring
100: Fixing hinge
119: Hole
144: Protrusion
181: Guide hole
371: Rotational shaft groove Hereinafter, preferred exemplary embodiments of the present invention will be described in detail with reference to the accompanying drawings. Hereinafter, in adding reference numerals to components of respective drawings, it should be noted that the same components will be designated by the same reference numerals as possible although not illustrated in different drawings.

BEST MODE

FIG. 1 is a perspective view of a foldable kick board according to the present invention.

Referring to FIG. 1, a foldable kick board according to the present invention is constituted by a footboard 10 on which a user's foot is placed as the same configuration as a conventional kick board, a steering portion 30 provided with a front wheel 32 to steer a moving direction, handle shaft portions 42, 43, 44, and 45 connected with the steering portion 30, and a handle portion 69 constituted at upper ends of the handle shaft portions 42, 43, 44, and 45 to be held by both hands of the user.

Figure 2:
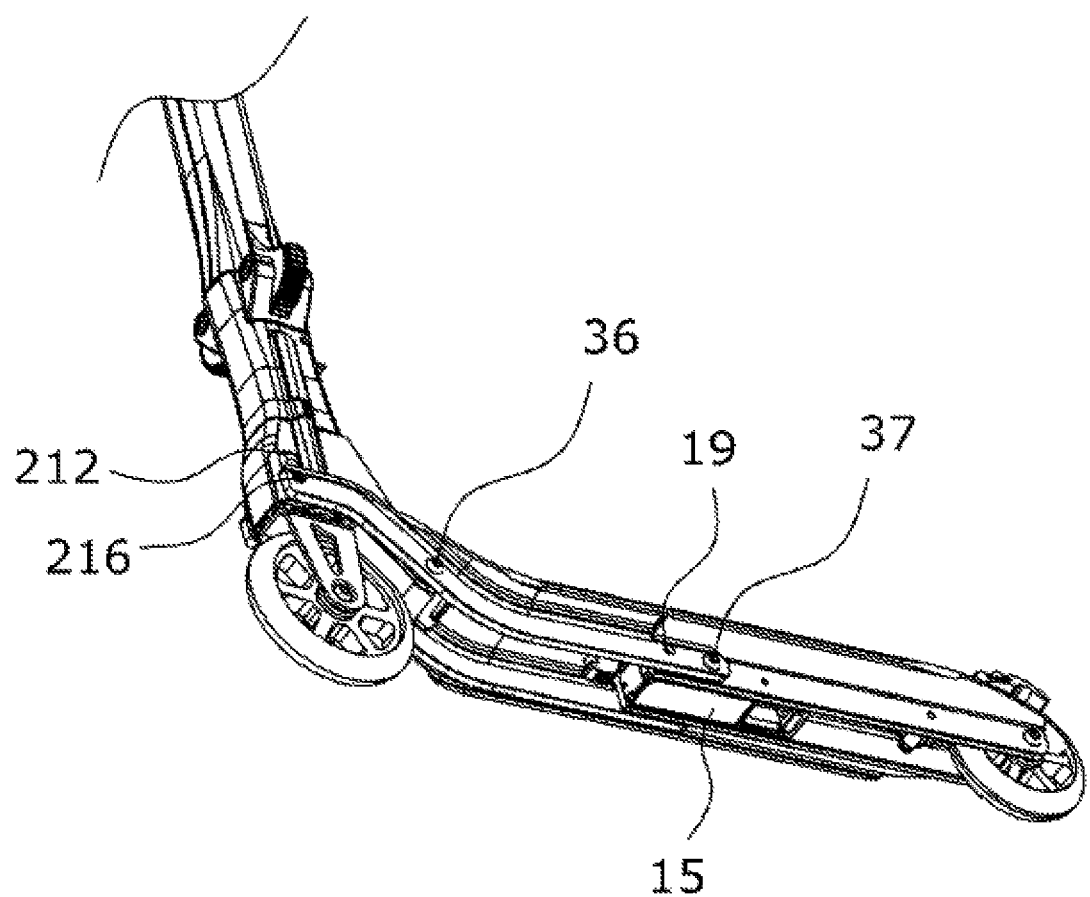
FIG. 2 is a perspective view illustrating an appearance of a first step in which a footboard and a foot front are folded in the foldable kick board according to the present invention.

FIG. 2 is a perspective view illustrating an appearance of a first step in which a footboard and a foot front are folded in the foldable kick board according to the present invention.

Referring to FIG. 2, in a state where the footboard 10 and a foot front 14 of the present invention are connected to each other by a rotational shaft 37, while both locking protrusions 17 protrude to be inserted into a locking hole 19, the footboard 10 and the foot front 14 are not folded based on the rotational shaft 37.

Figure 3:
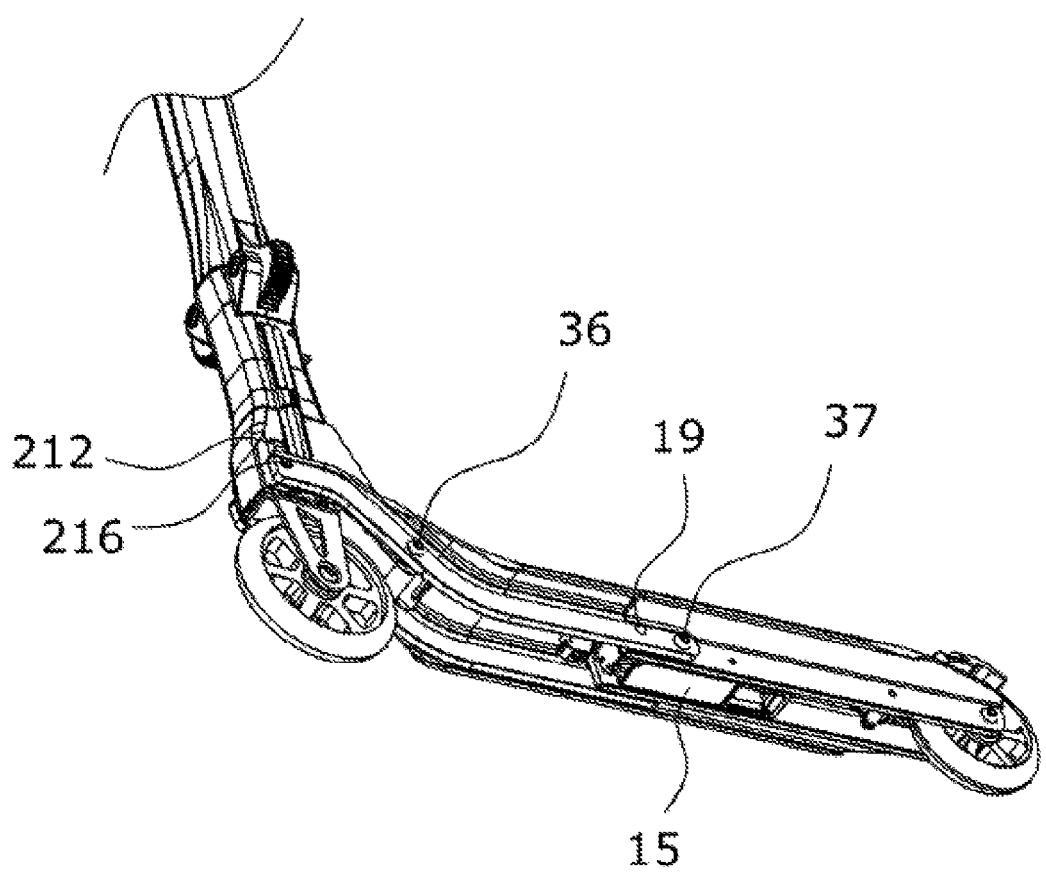
FIG. 3 is a perspective view illustrating an appearance of a second step in which the footboard and the foot front are folded in the foldable kick board according to the present invention.

FIG. 3 is a perspective view illustrating an appearance of a second step in which the footboard and the foot front are folded in the foldable kick board according to the present invention.

Referring to FIG. 3, when a locking body 15 of the present invention is pushed to the right, the locking protrusion 17 inserted into the locking hole 19 moves inward so as not to be inserted to the locking hole 19.

Accordingly, the locking of the foot front 14 and the footboard 10 of the present invention is released.

Figure 4:
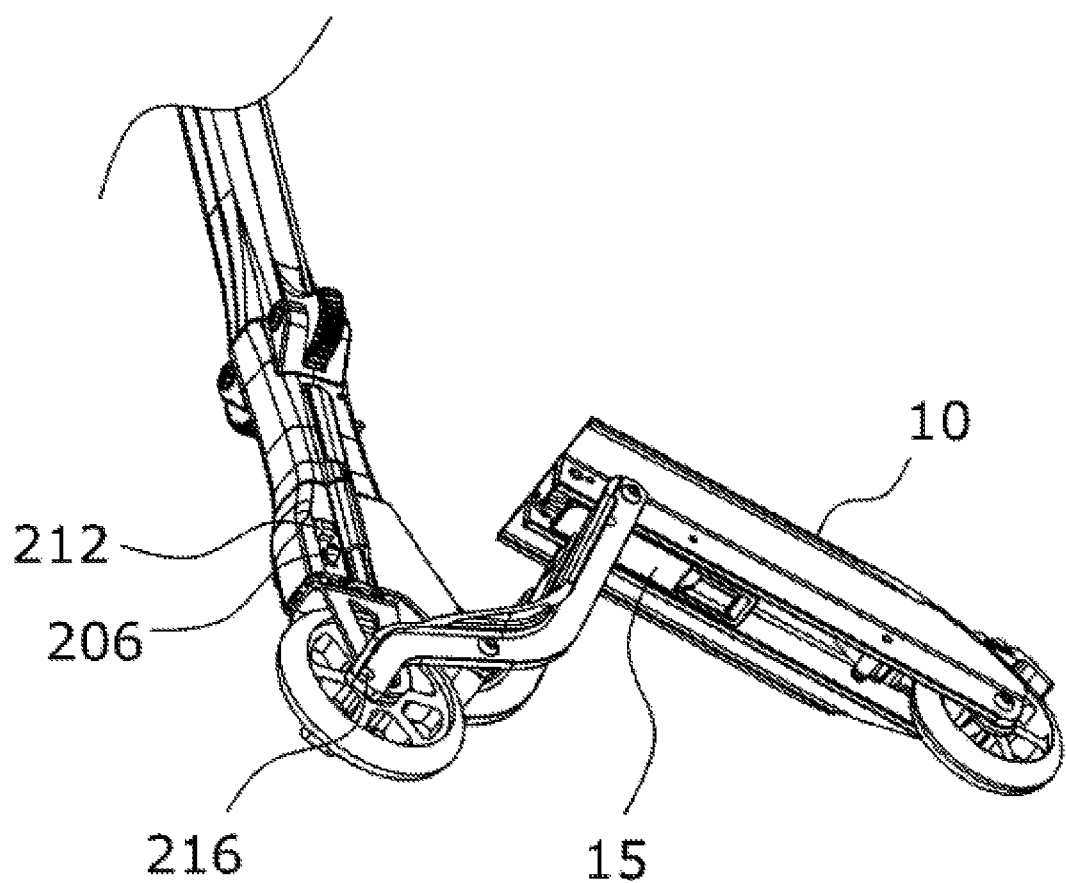
FIG. 4 is a perspective view illustrating an appearance of a third step in which the footboard and the foot front are folded in the foldable kick board according to the present invention.

FIG. 4 is a perspective view illustrating an appearance of a third step in which the footboard and the foot front are folded in the foldable kick board according to the present invention.

Referring to FIG. 4, when the locking of the foot front 14 and the footboard 10 of the present invention is released, the footboard 10 is bent while rotating based on the rotational shaft 37.

Figure 5:
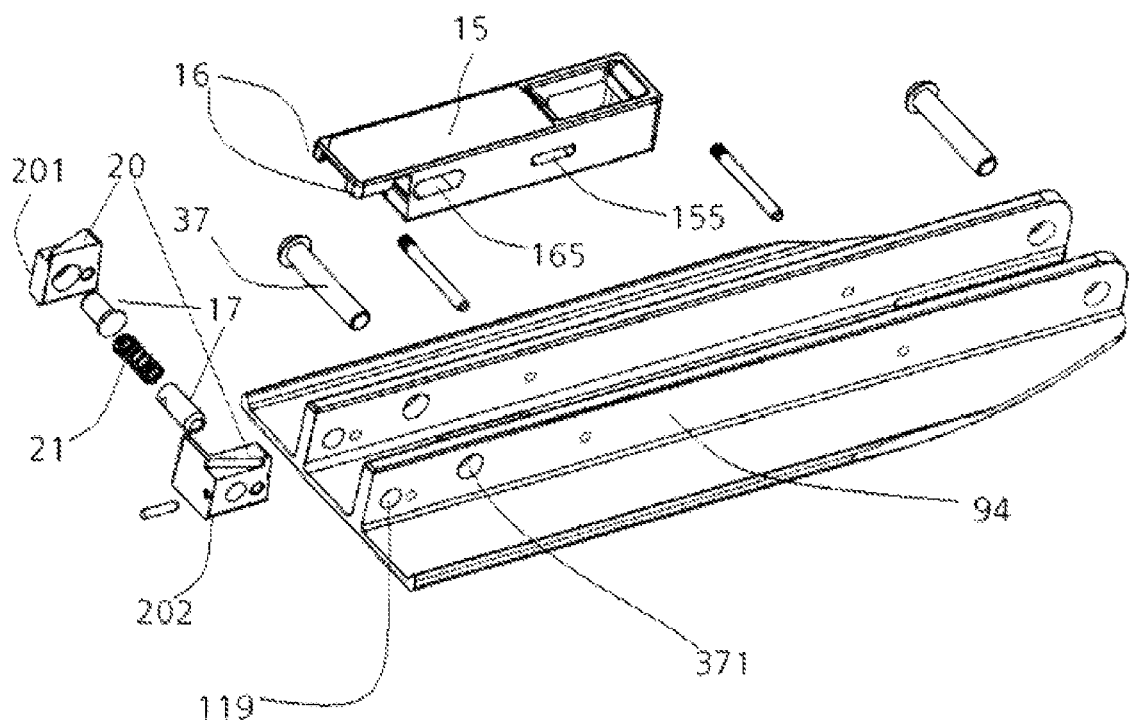
FIG. 5 is an exploded perspective view illustrating a configuration in which a locking module provided at the bottom of the footboard is exploded in the foldable kick board according to the present invention.

FIG. 5 is an exploded perspective view illustrating a configuration in which a locking module provided at the bottom of the footboard is exploded in the foldable kick board according to the present invention.

Referring to FIG. 5, in the foldable kick board according to the present invention, a pair of guide plates 94 is provided at the bottom of the footboard 10 on which the user's foot is placed, and a locking body 15 is fitted between the pair of guide plates 94 so as to slide.

A pair of locking portions 201 and 202 is disposed at the front portion of the bottom of the footboard 10 of the present invention, a cylindrical locking protrusion 17 is provided in each of the locking portions 201 and 202 to be fixed to each of the locking portions 201 and 202, and a coil spring 21 is provided between the locking protrusions 17.

An upper portion of each of the locking portions 201 and 202 according to the present invention has a right-triangular portion 20 protruding in a right-triangular shape, and the respective right-triangular portions 20 have a symmetrical shape in which height portions of the right-triangles face each other.

Each locking protrusion 17 of the present invention is disposed to be inserted into the hole 119 and an oblique side of the right-triangular portion 20 of the locking portion 201 is in contact with protrusions 16 formed on both sides of the bottom of the front portion of the locking body 15.

Two through holes 165 and 155 passing through the sides are formed in the locking body 15 of the present invention, and the locking body 15 is provided in the guide plate 94 while the rotational shaft 37 is inserted into the front through hole 165 and the other shaft is inserted into the rear through hole.

Figure 6:
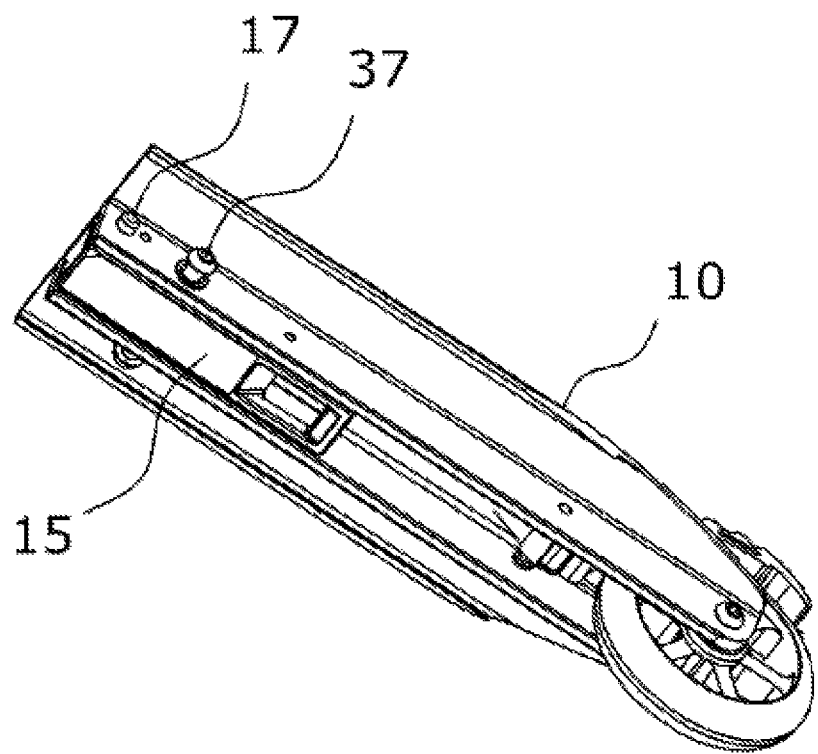
FIG. 6 is a perspective view of an appearance in which a locking rod for fixing the foot front protrudes to the outside of a locking groove while a locking body provided at the bottom of the footboard stops in the foldable kick board according to the present invention.

FIG. 6 is a perspective view of an appearance in which a locking rod for fixing the foot front protrudes to the outside of a locking groove while a locking body provided at the bottom of the foot board stops in the foldable kick board according to the present invention.

Figure 7:
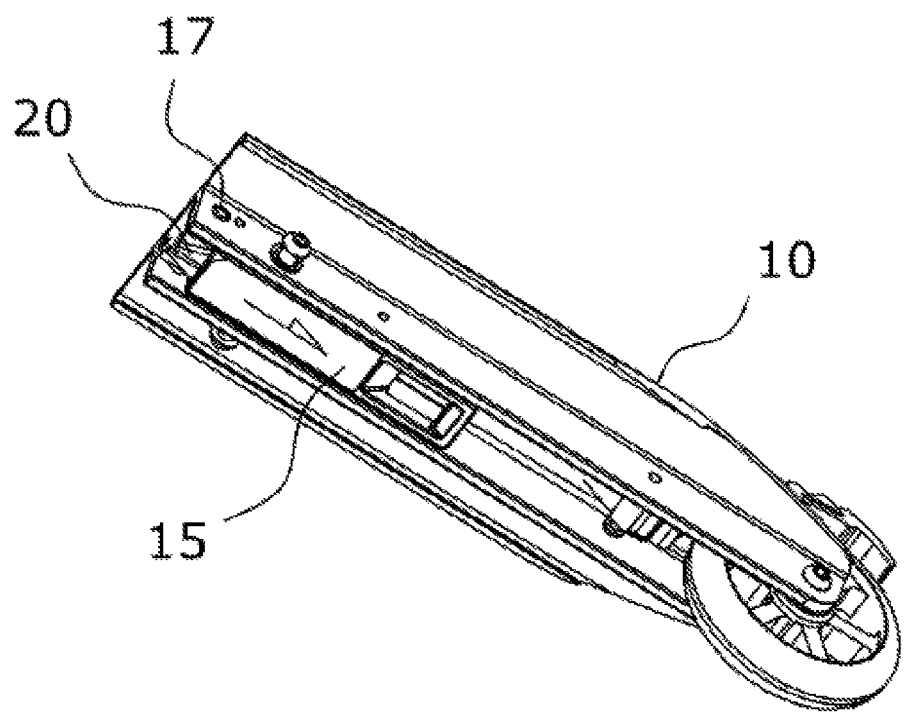
FIG. 7 is a perspective view of an appearance in which the locking rod for fixing the foot front is inserted into the locking groove while the locking body provided at the bottom of the footboard slides backward in the foldable kick board according to the present invention.

FIG. 7 is a perspective view of an appearance in which the locking rod for fixing the foot front is inserted into the locking groove while the locking body provided at the bottom of the footboard slides backward in the foldable kick board according to the present invention.

Referring to FIG. 7, when the user pushes the locking body 15 of the present invention backward, a gap between the pair of locking portions 201 and 202 is decreased. Accordingly, the locking rods 17 provided to be fixed to the locking portions 201 and 202 are inserted into the locking grooves 19, respectively. Therefore, the locking rods 17 of the present invention do not protrude to the outer side of the guide plate 94 of the present invention.

Figure 8:
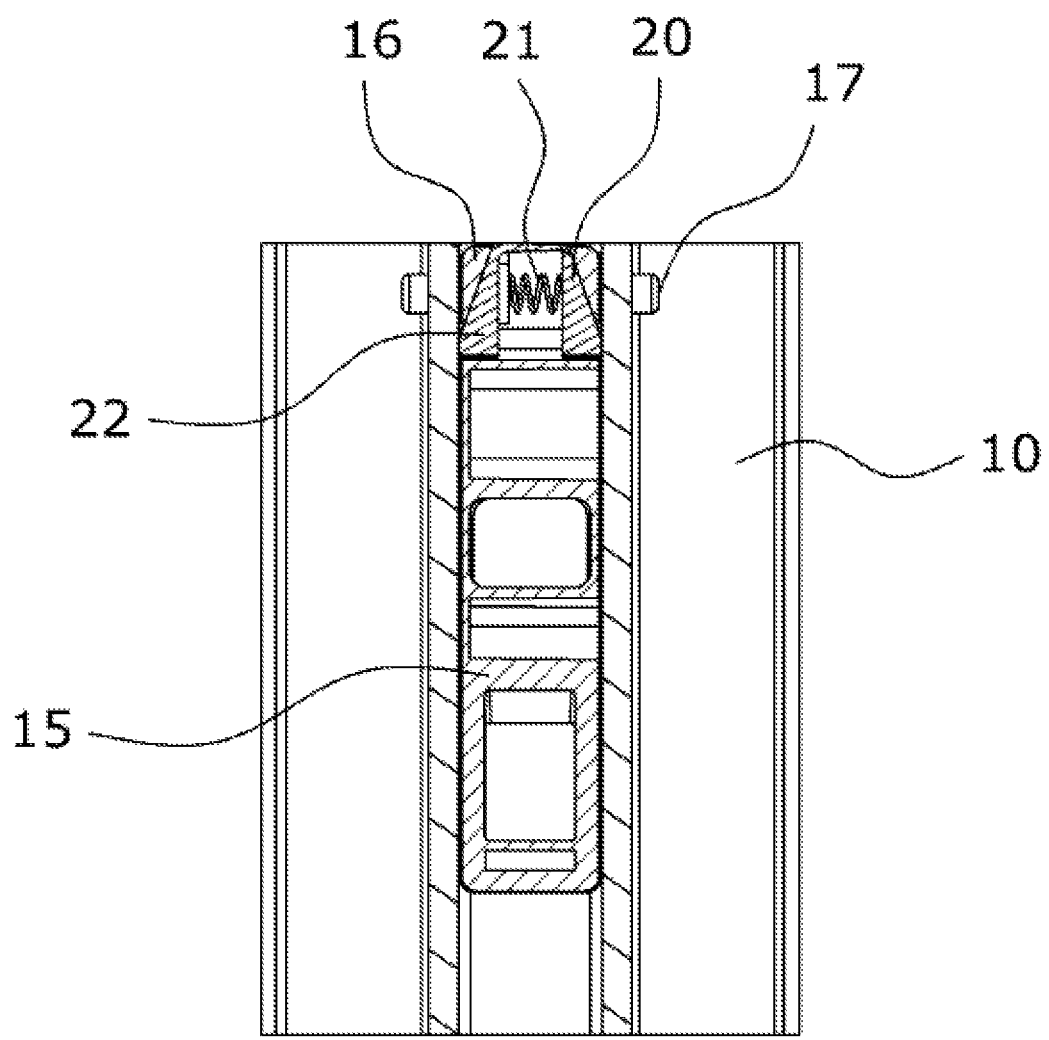
FIG. 8 is a cross-sectional view of an appearance in which the locking rod for fixing the foot front protrudes to the outside of the locking groove while the locking body provided at the bottom of the footboard stops in the foldable kick board according to the present invention.
Figure 9:
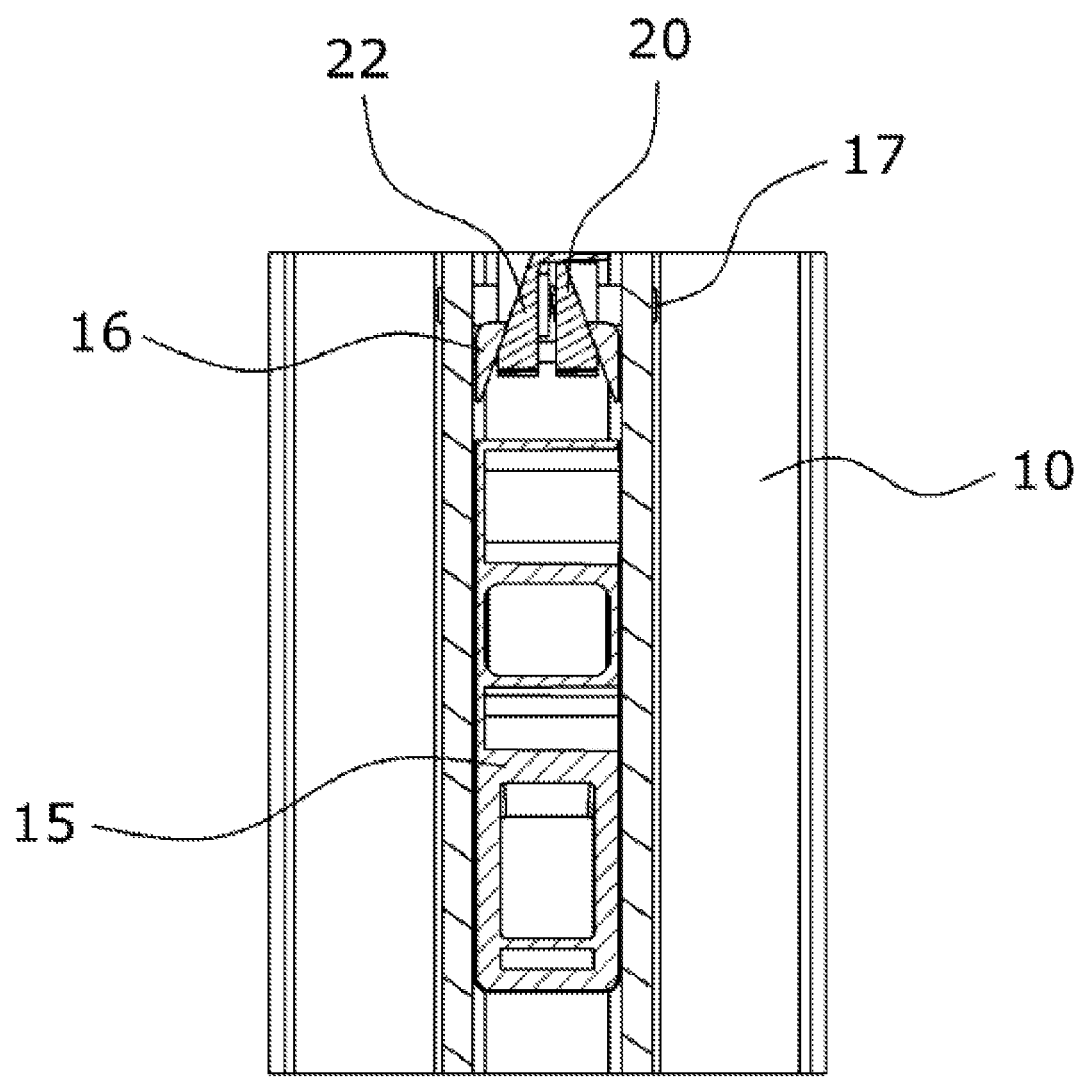
FIG. 9 is a cross-sectional view of an appearance in which the locking rod for fixing the foot front is inserted into the locking groove while the locking body provided at the bottom of the footboard slides backward in the foldable kick board according to the present invention.

FIG. 8 is a cross-sectional view of an appearance in which the locking rod for fixing the foot front protrudes to the outside of the locking groove while the locking body provided at the bottom of the footboard stops in the foldable kick board according to the present invention. FIG. 9 is a cross-sectional view of an appearance in which the locking rod for fixing the foot front is inserted into the locking groove while the locking body provided at the bottom of the footboard slides backward in the foldable kick board according to the present invention.

Referring to FIG. 8, the locking portions 201 and 202 and the locking rods 17 are pushed in a horizontal direction by elastic force of the coil spring 21 such that the left and right locking rods 17 protrude to the outside of the hole 119 formed in the guide plate 94, and the protruding locking rod 17 is inserted into the locking hole 19 of the foot front 14 such that the footboard 10 is fixed to the foot front 14.

A pair of protrusions 16 is formed at the front portion of the bottom of the locking body 15 of the present invention and the pair of protrusions 16 is constituted to be in contact with the oblique sides of the right-triangular portions 20 formed at the upper ends of the locking portions 201 and 202.

Referring to FIG. 9, when the user pushes the locking body 15 of the present invention backward, a distance between the two right-triangular portions 20 is decreased while the protrusion 16 formed at the bottom of the locking body is pushed backward, and as a result, the gap between the pair of locking portions 201 and 202 is decreased.

In addition, the locking rods 17 provided to be fixed to the locking portions 201 and 202 are inserted into the holes 119, respectively. Therefore, the locking rods 17 of the present invention do not protrude to the outer side of the guide plate 94 of the present invention.

In this state, in the footboard 10 according to the present invention, the locking with the foot front 14 is released and as illustrated in FIG. 4, the footboard 10 may be bent.

Figure 10:
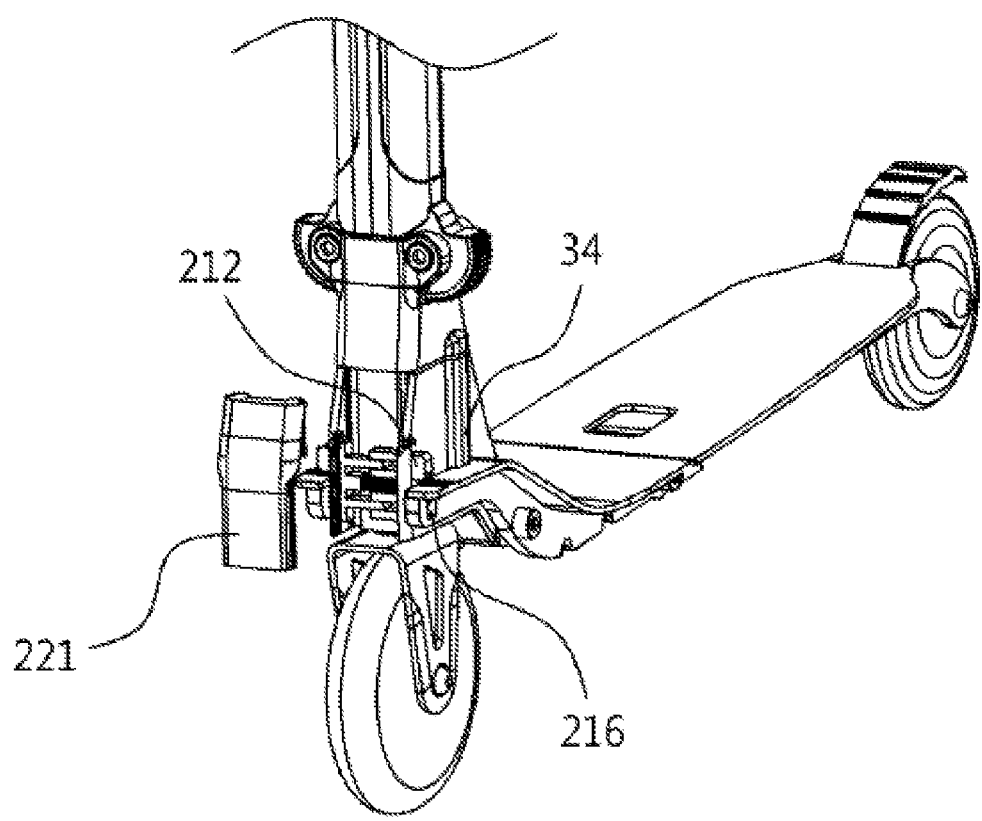
FIG. 10 is an exploded perspective view of a locker portion constituted so that the foot front is folded to a body portion in the foldable kick board according to the present invention.
Figure 11:
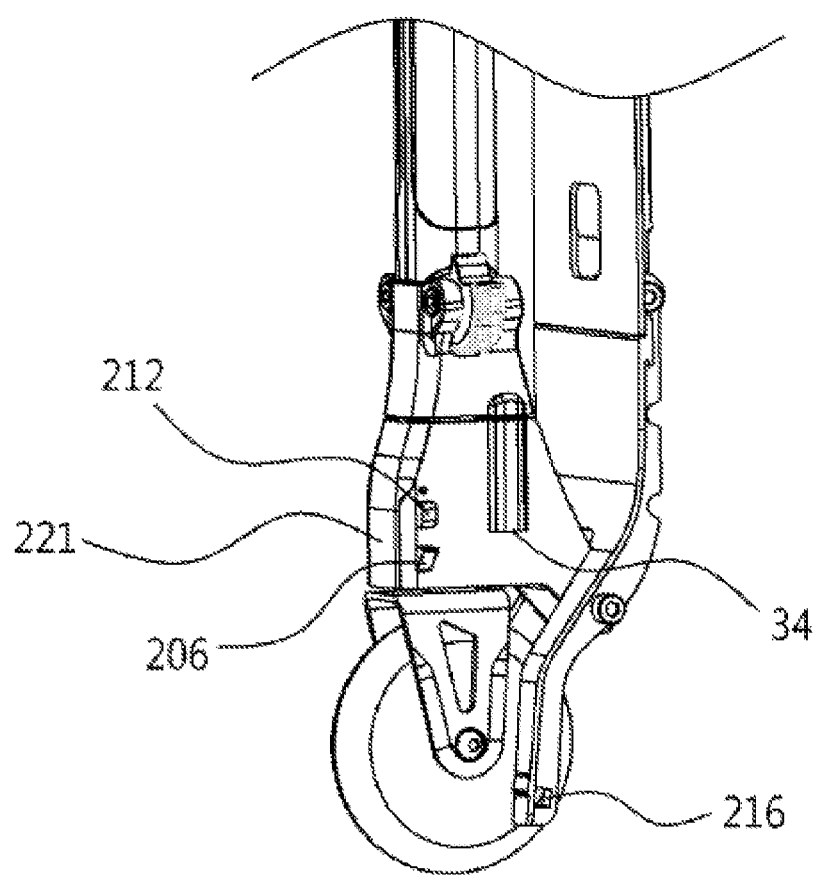
FIG. 11 is a perspective view of an appearance in which the foot front is folded to the body portion in the foldable kick board according to the present invention.

FIG. 10 is an exploded perspective view of a locker portion constituted so that the foot front is folded to a body portion in the foldable kick board according to the present invention. FIG. 11 is a perspective view of an appearance in which the foot front is folded to the body portion in the foldable kick board according to the present invention.

Referring to FIGS. 10 and 11, in the foldable kick board according to the present invention, a locker portion for locking the foot front 14 to the body portion 30 is pressed together with a locking protrusion 206 engaged with the locking groove 216 of the foot front 14 when the user presses a pressing portion 212 protruding from both sides of the body portion 30 of the present invention by a finger. In this state, the user of the present invention folds the foot front 14 by rotating the foot front 14 counterclockwise.

Units in which the pressing portion 212 and the locking protrusion 206 according to the present invention are configured as one body are disposed to face each other one to one and a coil spring is fitted therebetween. A front portion of the locker portion according to the present invention is constituted to be covered by a cover 221.

Figure 12:
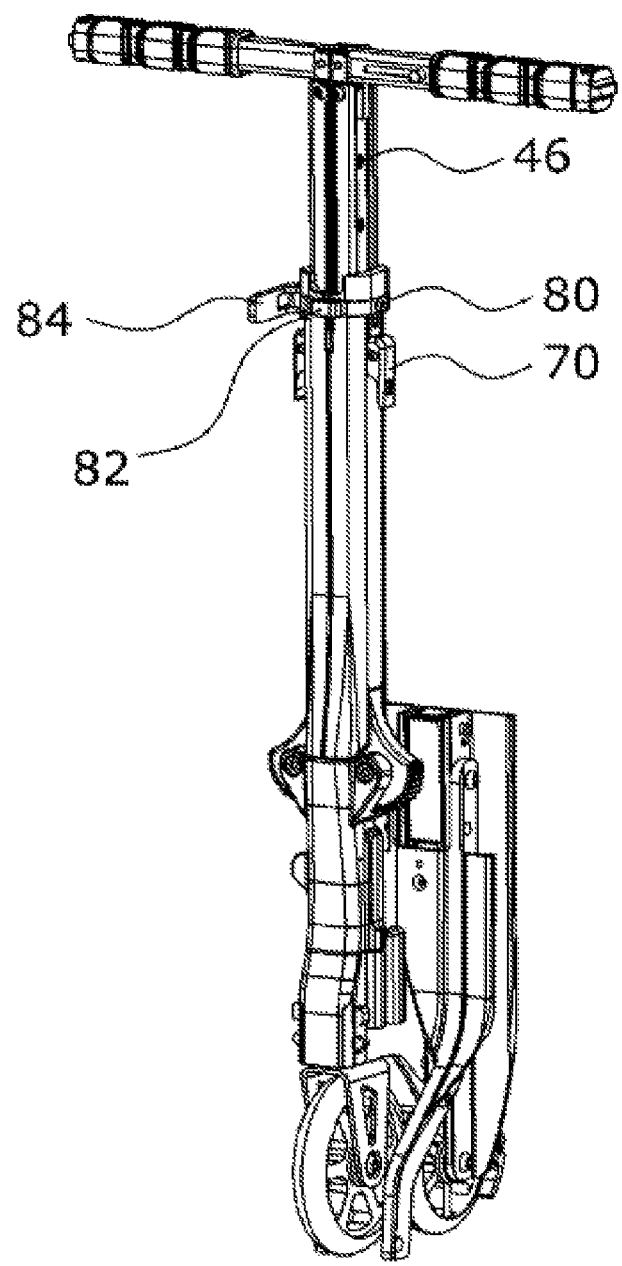
FIG. 12 is a perspective view illustrating an appearance in which a first upper unit and a part of a second upper unit of a handle shaft portion are inserted to a first lower unit and a second lower unit downward while the footboard and the foot front are fully folded in the foldable kick board according to the present invention.

FIG. 12 is a perspective view of an appearance in which a first upper unit and a part of a second upper unit of a handle shaft portion are inserted to a first lower unit and a second lower unit downward while the footboard and the foot front are fully folded in the foldable kick board according to the present invention.

Referring to FIG. 12, stopping grooves 46 are formed at predetermined intervals on sides of the first upper unit 42 and the second upper unit 44 according to the present invention.

A stopping rod 72 is provided in a stopping lever 70 provided in the first lower unit 43 and the second lower unit 45 according to the present invention, and the stopping rod 72 is inserted into the stopping groove 46 such that the first upper unit 42 and the second upper unit 44 are fixed to the first lower unit 43 and the second lower unit 45.

In the kick board according to the present invention, for safety in use, one locking module is further provided in addition to fixing the first upper unit 42 and the second upper unit 44 by the stopping lever 70.

A locking lever 84 is provided at the upper ends of the first lower unit 43 and the second lower unit 45 of the present invention. When the locking lever 84 is rotated clockwise, a first locking band 80 and a second locking band 82 of which hook-shaped end portions 81 and 83 are engaged with each other tighten the upper ends of the first lower unit 43 and the second lower unit 45 according to the present invention and also tighten the first upper unit 42 and the second upper unit 44 at the same time.

Figure 13:
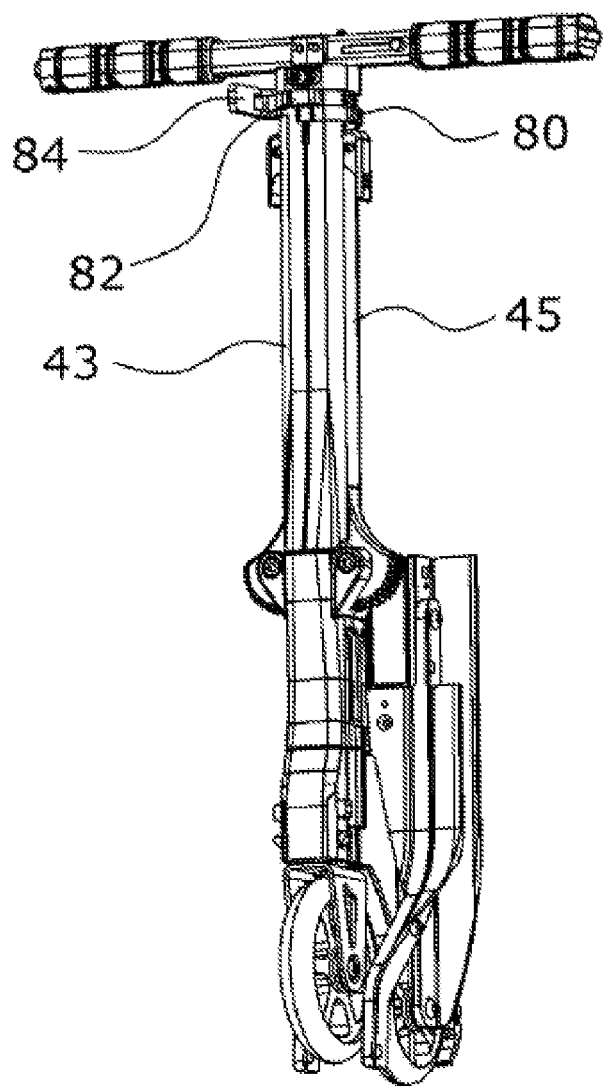
FIG. 13 is a perspective view illustrating an appearance in which the first upper unit and all of the second upper unit of the handle shaft portion are inserted to the first lower unit and the second lower unit downward while the footboard and the foot front are fully folded in the foldable kick board according to the present invention.

FIG. 13 is a perspective view of an appearance in which the first upper unit and all of the second upper unit of the handle shaft portion are inserted to the first lower unit and the second lower unit downward while the footboard and the foot front are fully folded in the foldable kick board according to the present invention.

Referring to FIG. 13, when the first upper unit 42 and the second upper unit 44 according to the present invention fully slide downward to be inserted into the first lower unit 43 and the second lower unit 45, the first locking band 80 slides downward while deviating from the second locking band 82.

In the second upper unit 44 of the present invention, a protrusion 144 is formed, and the first locking band 80 slides downward along the guide hole 181 by the bottom of the protrusion 144 while the second upper unit 44 of the present invention slides downward such that the first locking band 80 deviates from the second locking band 82 fixed to the first upper unit 42 to slide downward.

The first locking band 80 according to the present invention is located at the lower portion by deviating from the second locking band 82 fixed to the first upper unit 42 such that the first lower unit 43 and the second lower unit 44 may be independently engaged with teeth 90 and rotated horizontally, respectively.

Figure 14:
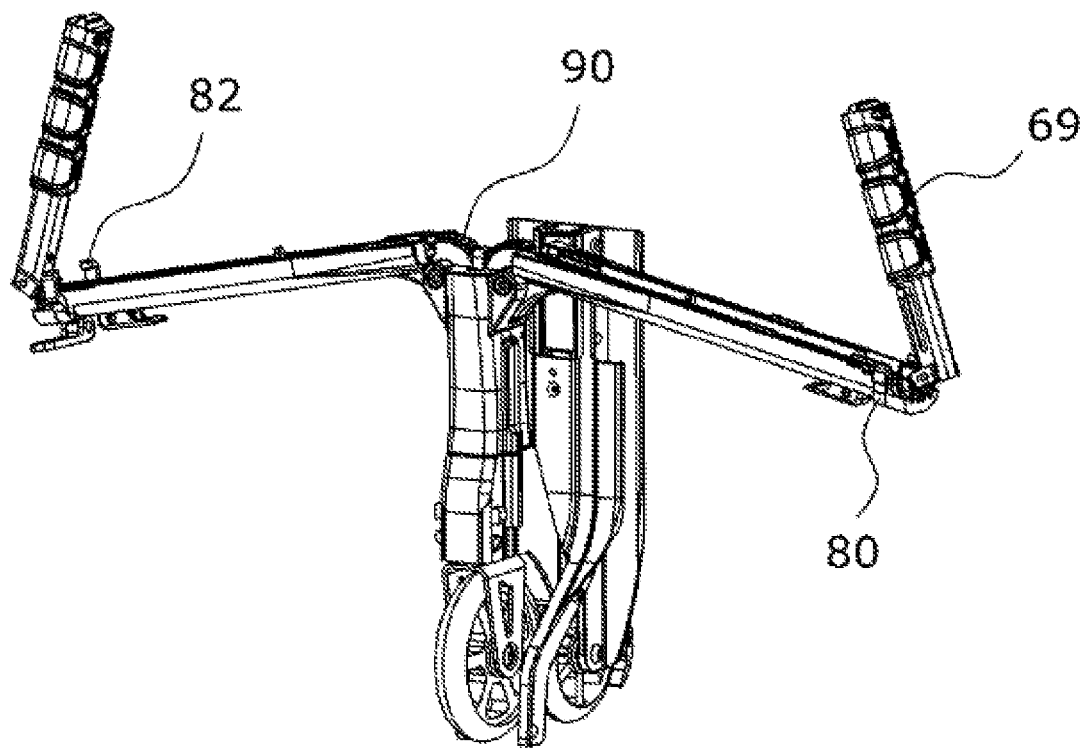
FIG. 14 is a perspective view illustrating an appearance in which the first lower unit inserted to the first upper unit and the second lower unit inserted to the second upper unit are engaged with teeth and separated in left and right directions, respectively, in the foldable kick board according to the present invention.

FIG. 14 is a perspective view illustrating an appearance in which the first lower unit to which the first upper unit is inserted and the second lower unit to which the second upper unit is inserted are engaged with teeth and separated horizontally, respectively.

Referring to FIG. 14, in the end portions of the first lower unit 43 and the second lower unit 45 according to the present invention, portions connected with the body portion 30 are constituted by the teeth 90 such that the respective teeth 90 of the first lower unit 43 and the second lower unit 45 are configured to move while rotating at the same time.

Figure 15:
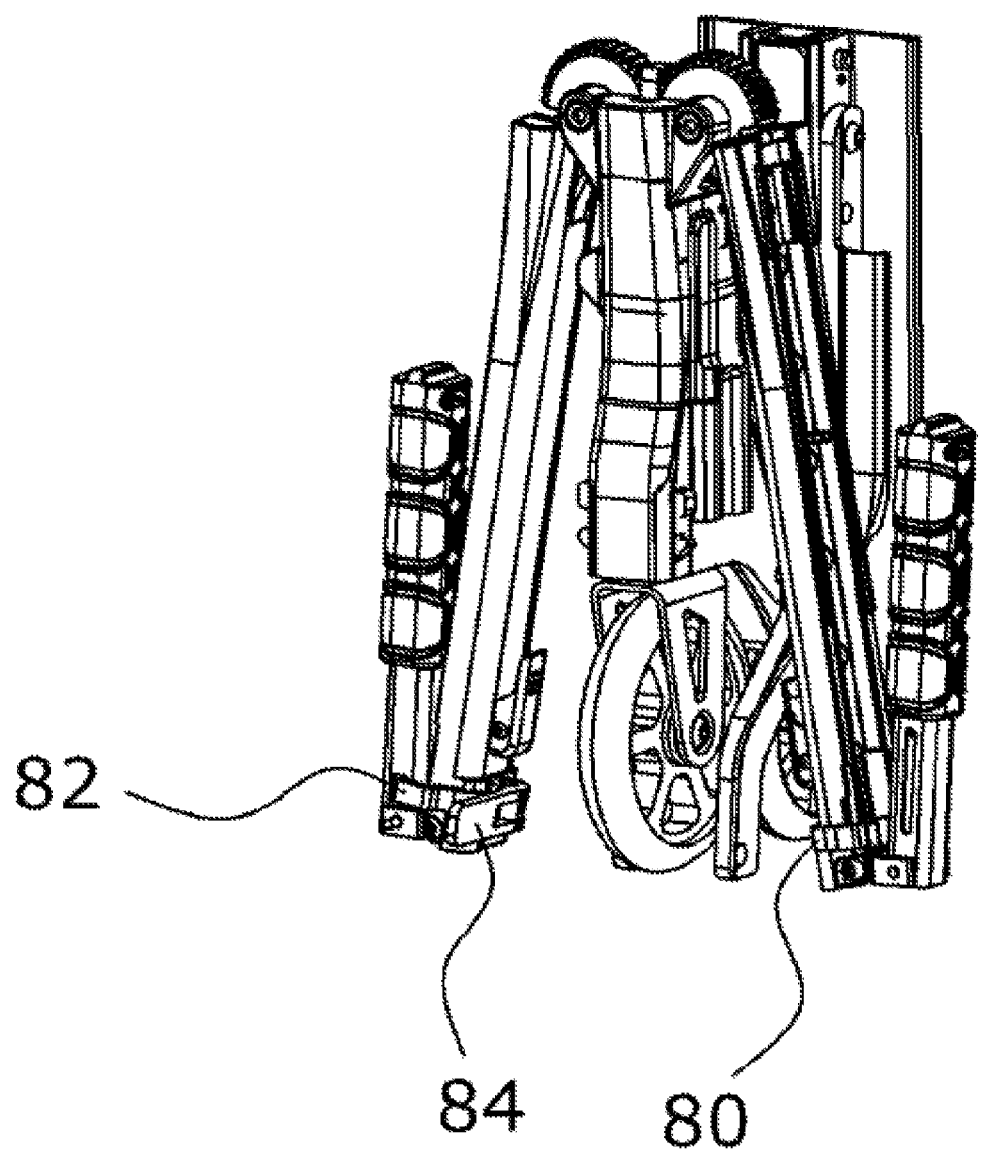
FIG. 15 is a perspective view illustrating an appearance immediately before the foldable kick board according to the present invention is fully folded.

FIG. 15 is a perspective view illustrating an appearance immediately before the foldable kick board according to the present invention is fully folded.

Referring to FIG. 15, while a right handle 69 and a pipe 68 and a left handle and a pipe 168 according to the present invention are folded, respectively, the foldable kick board according to the present invention is fully folded.

Figure 16:
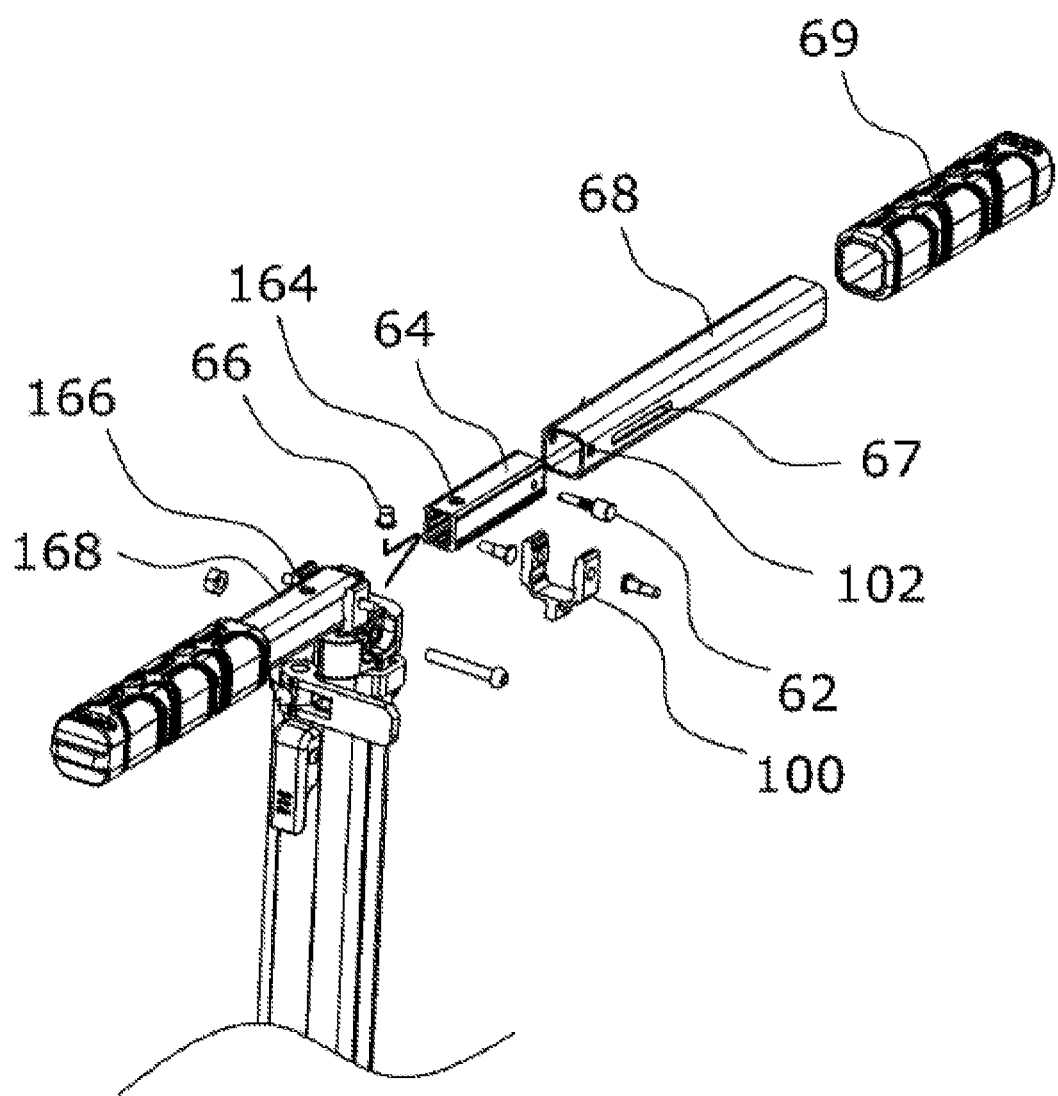
FIG. 16 is an exploded perspective view of a handle portion of the foldable kick board according to the present invention.

FIG. 16 is an exploded perspective view of a handle portion of the foldable kick board according to the present invention.

Referring to FIG. 16, the handle portion of the foldable kick board according to the present invention is constituted by left and right handle pipes 169 and 69 to which the handle 69 made of rubber, silicon, or the like is fitted, and a fixing hinge 100 for fixing the left and right handle pipes 169 and 69 of the present invention to the first upper unit 42 and the second upper unit 44, respectively.

The left and right handle pipes 169 and 69 coupled to the fixing hinge 100 are inserted into one shaft to be rotated.

However, when the user rides the foldable kick board by fully unfolding the foldable kick board according to the present invention, it is dangerous if the left and right handle pipes 169 and 69 are not fixed but rotated, and thus, a pipe-shaped handle locker 64 is provided in the right handle pipe 68.

A straight groove is formed in a longitudinal direction at a side of the right handle pipe 68 according to the present invention, a handle locker 64 having a square pipe shape is inserted into the handle pipe 62, and the handle locker 64 is configured to be connected and fixed to a locking button 62 which moves along the straight groove 67 formed in the longitudinal direction at the right handle pipe 68.

A nipple button 66 connected with a spring is provided in the pipe-shaped handle locker 64 according to the present invention, and the user moves the locking button 62 in a left direction and also moves the handle locker 64 connected with the locking button 62 to the left. As a result, the handle locker 64 is simultaneously positioned inside the right handle pipe 168 and inside the left handle pipe 69 such that the left and right handle pipes 169 and 69 are fixed without moving.

Figure 17:
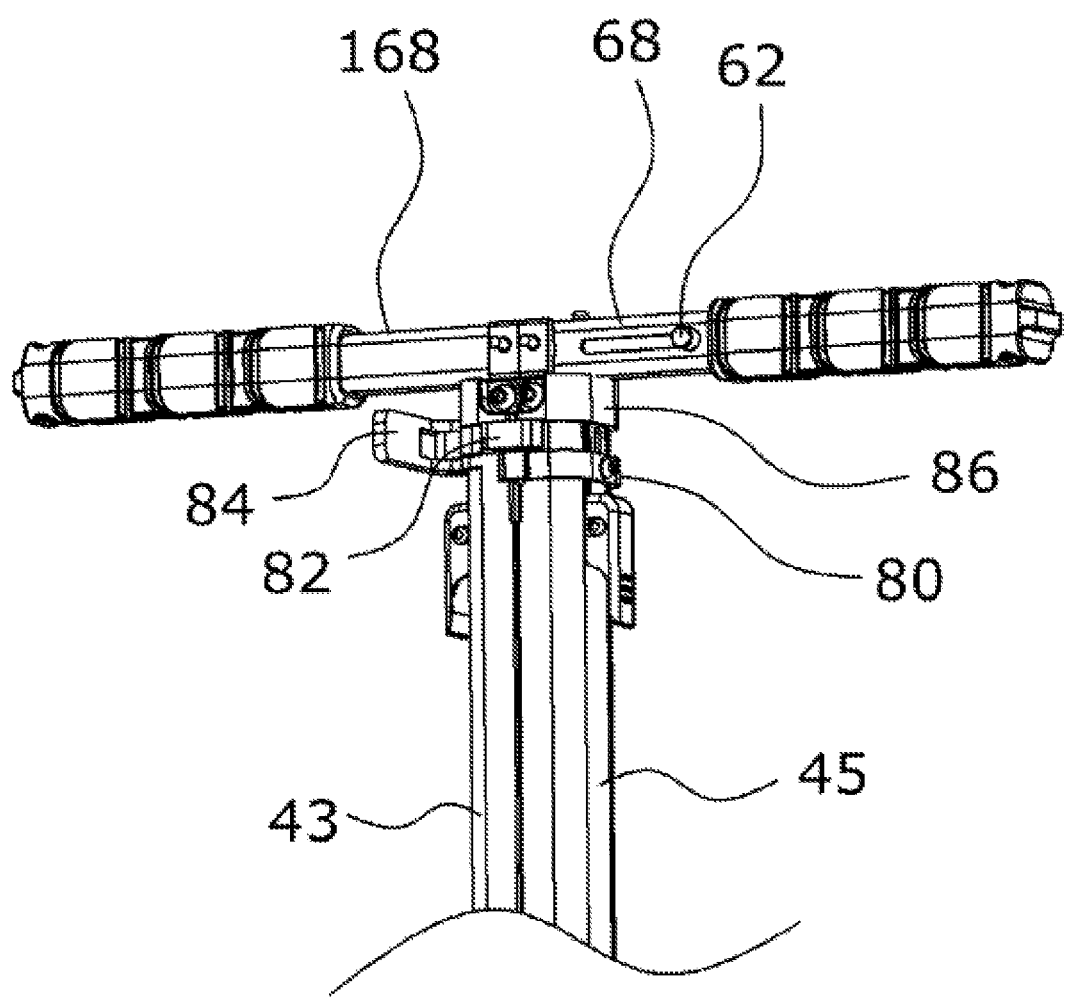
FIG. 17 is a perspective view illustrating an appearance in which the first lower unit and the second lower unit are rotated to be in contact with each other while the kick board according to the present invention is fully folded.
Figure 18:
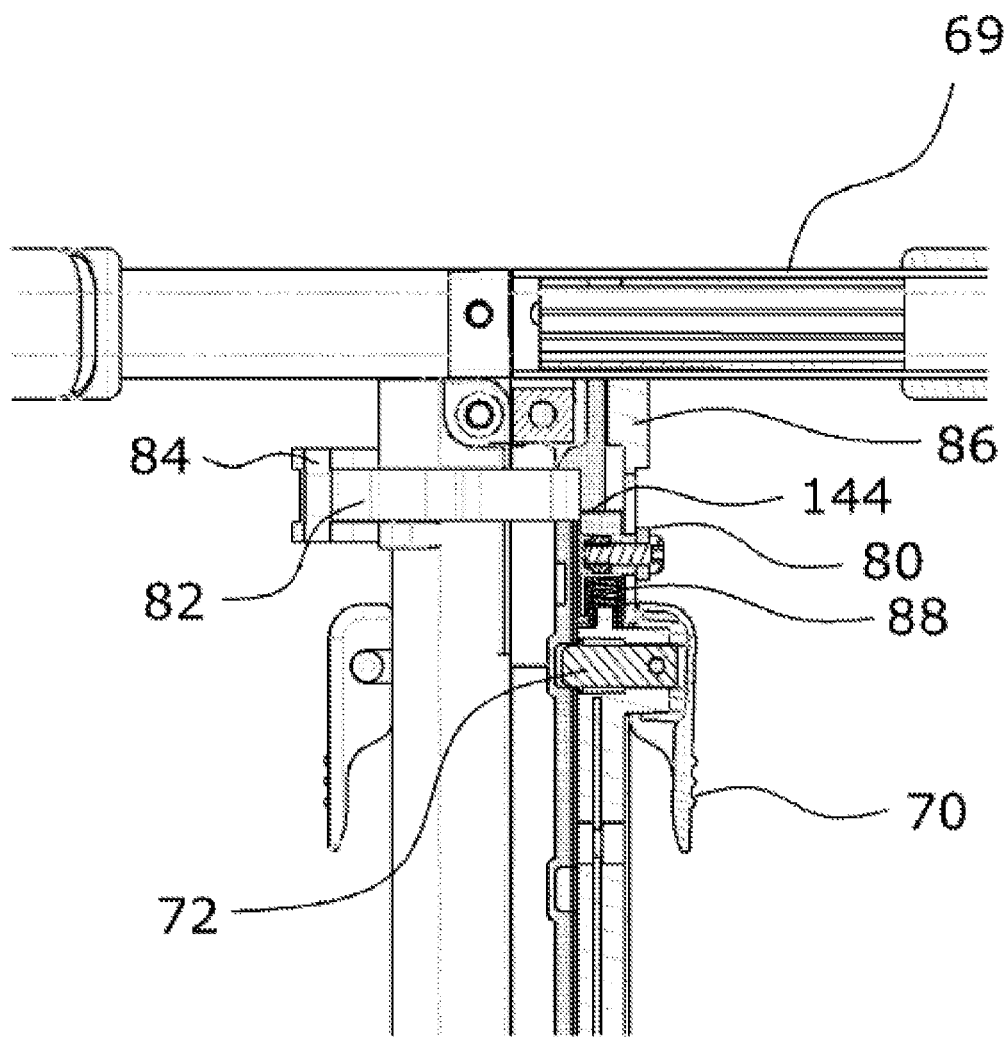
FIG. 18 is a partially cut front view illustrating an appearance in which the first lower unit and the second lower unit are rotated to be in contact with each other while the kick board according to the present invention is fully folded.

FIG. 17 is a perspective view illustrating an appearance in which the first lower unit and the second lower unit are rotated to be in contact with each other while the kick board according to the present invention is fully folded. FIG. 18 is a partially cut front view illustrating an appearance in which the first lower unit and the second lower unit are rotated to be in contact with each other while the kick board according to the present invention is fully folded.

Referring to FIGS. 17 and 18, in a state where the kick board according to the present invention is fully folded, when the first lower unit 43 and the second lower unit 45 rotate to be in contact with each other, the first locking band 80 and the second locking band 82 are disposed at different positions.

The first locking band 80 is pressed toward the lower portion of the guide hole 181 by the bottom of the protrusion 144 formed in the second upper unit 44 of the present invention such that the first locking band 80 is disposed at a different position from the second locking band 82 fixed to the first upper unit 42.

Figure 19:
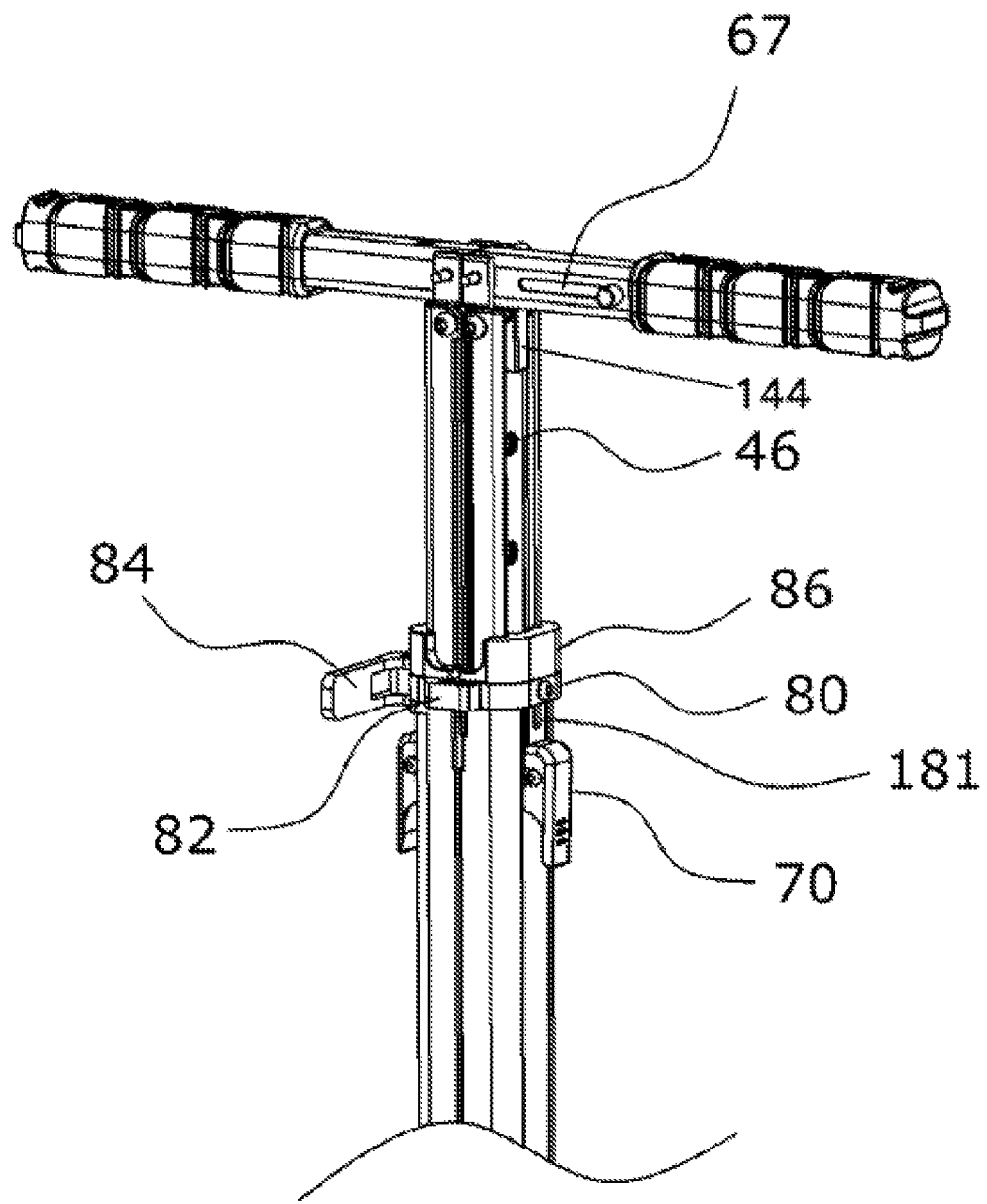
FIG. 19 is a perspective view illustrating an appearance in which the first upper unit and the second upper unit slide upward while the first lower unit and the second lower unit are rotated to be in contact with each other in the kick board according to the present invention.
Figure 20:
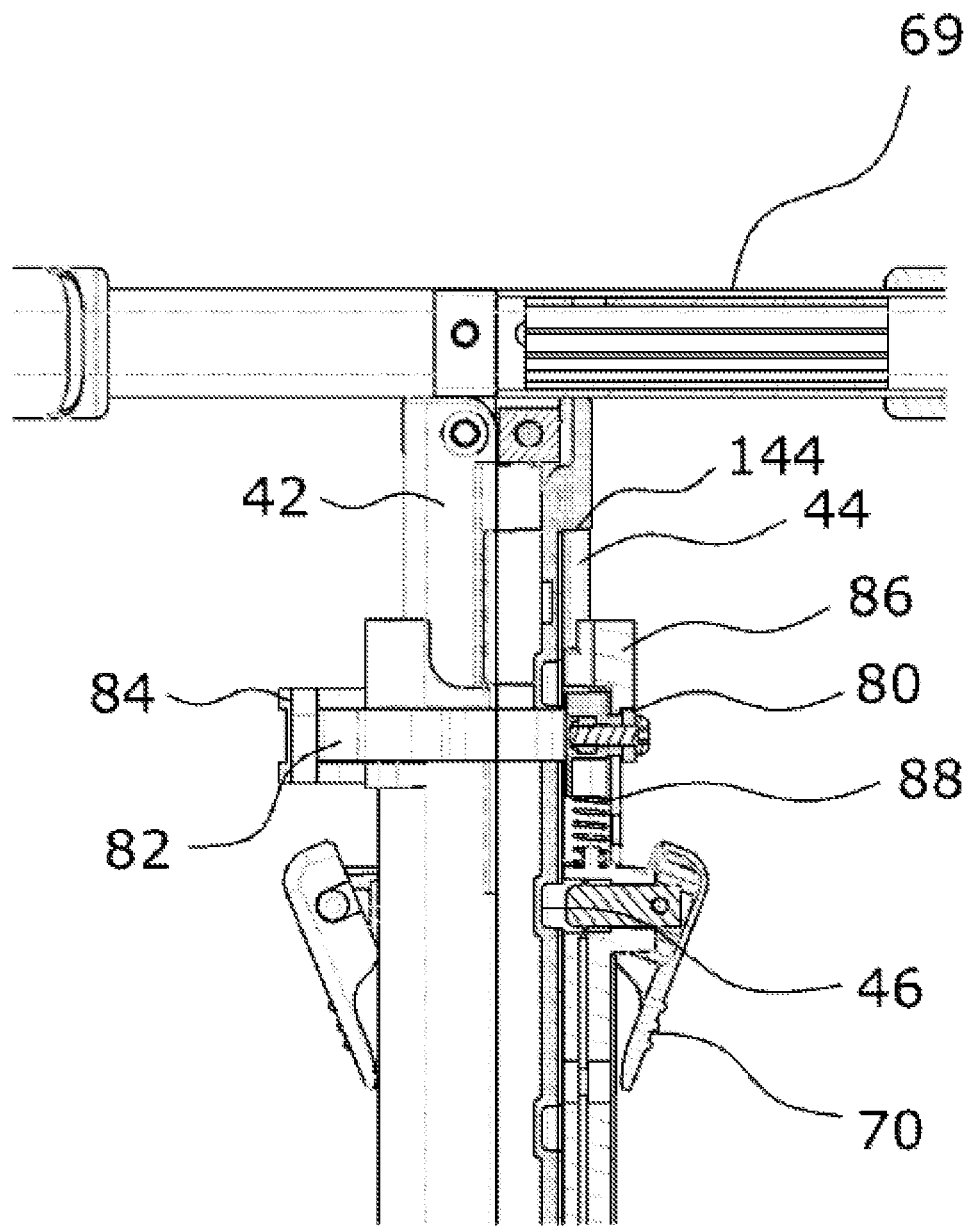
FIG. 20 is a partially cut front view illustrating an appearance in which the first upper unit and the second upper unit slide upward while the first lower unit and the second lower unit are rotated to be in contact with each other in the kick board according to the present invention.

FIG. 19 is a perspective view illustrating an appearance in which the first upper unit and the second upper unit slide upward while the first lower unit and the second lower unit are rotated to be in contact with each other in the kick board according to the present invention. FIG. 20 is a partially cut front view illustrating an appearance in which the first upper unit and the second upper unit slide upward while the first lower unit and the second lower unit are rotated to be in contact with each other in the kick board according to the present invention.

Referring to FIGS. 19 and 20, stopping grooves 46 are formed at predetermined intervals on sides of the first upper unit 42 and the second upper unit 44 according to the present invention.

A stopping rod 72 is provided in a stopping lever 70 provided in the first lower unit 43 and the second lower unit 45 according to the present invention, and the stopping rod 72 is inserted into the stopping groove 46 such that the first upper unit 42 and the second upper unit 44 are fixed to the first lower unit 43 and the second lower unit 45. As a result, sliding lengths of the first upper unit 42 and the second upper unit 44 are adjusted.

In the kick board according to the present invention, for safety in use, one locking module is further provided in addition to fixing the first upper unit 42 and the second upper unit 44 by the stopping lever 70.

When the first upper unit 42 and the second upper unit 44 according to the present invention slide upward, the protrusion 144 formed in the second upper unit 44 of the present invention does not press the first locking band 80 any longer such that the first locking band 80 slides upward along the guide hole 181 by restoring force of a coil spring 88 provided therein and is disposed at the same position as the second locking band 82 fixed to the first upper unit 42.

In this case, the hook-shaped end portions 81 and 83 of the first locking band 80 and the second locking band 82 are engaged with each other.

In order to firmly fix the first upper unit 42 and the second upper unit 44 according to the present invention, when the user rotates the locking lever 84 provided at the upper end of the second lower unit 45, the first locking band 80 and the second locking band 82 of which the hook-shaped end portions 81 and 83 are engaged with each other tighten the upper ends of the first lower unit 43 and the second lower unit 45 and firmly tighten the first upper unit 42 and the second upper unit 44 at the same time.

Figure 21:
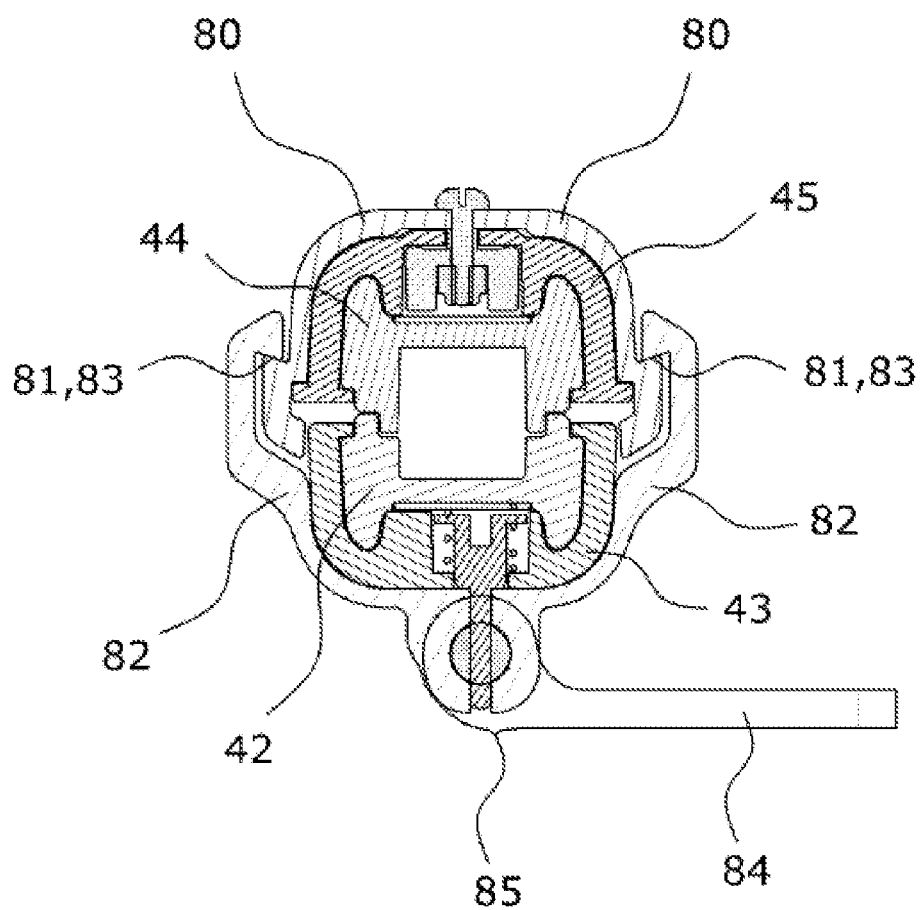
FIG. 21 is a cut view of the handle portion which is cut longitudinally and vertically in the kick board according to the present invention.
Figure 22:
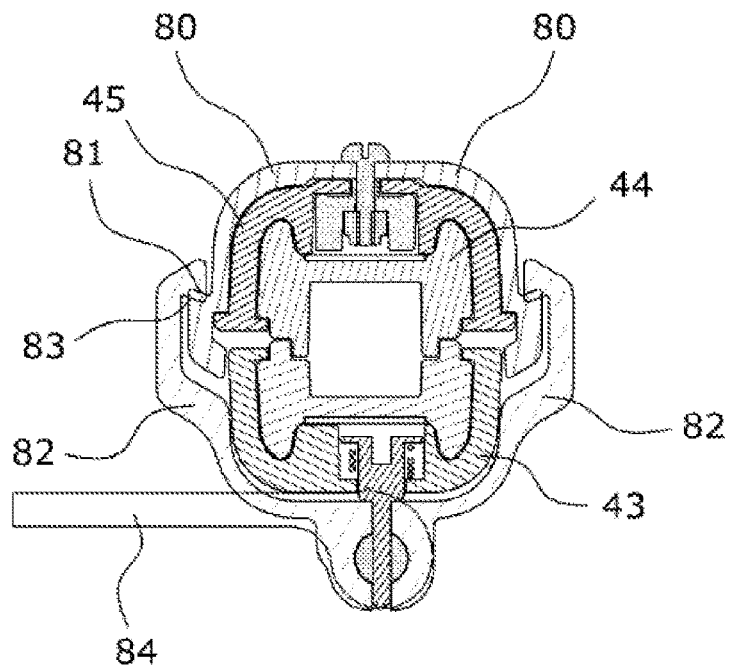
FIG. 22 is a cross-sectional view illustrating a configuration in which first and second locking bands are tightened by rotating the locking lever in the kick board according to the present invention.

FIG. 21 is a cut view of the handle portion which is cut longitudinally and vertically in the kick board according to the present invention. FIG. 22 is a cross-sectional view illustrating a configuration in which first and second locking bands are tightened by rotating the locking lever in the kick board according to the present invention.

Referring to FIGS. 21 and 22, when describing an internal configuration of the handle portion which is cut vertically in a longitudinal direction in the kick board according to the present invention, the first upper unit 42 and the second upper unit 44 are disposed at the innermost side and the first lower unit 43 and the second lower unit 45 cover the first upper unit 42 and the second upper unit 44.

At sides of the upper ends of the first lower unit 43 and the second lower unit 45 according to the present invention, the first locking band 80 and the second locking band 82 are provided, and the end portions 81 and 83 of the first locking band 80 and the second locking band 82 have hook shapes and are engaged with each other.

The locking lever 84 of the present invention is provided to be connected to the second locking band 82 and a tightening protrusion 85 is formed in the locking lever 84.

Referring to FIG. 22, when the locking lever 84 of the present invention is rotated clockwise, the second locking band 82 is separated from the surface of the first lower unit 43 by the protruding portion of the tightening protrusion 85 while the tightening protrusion 85 presses the surface of the first lower unit 43 and simultaneously, the second locking band 82 and the first locking band 80 of which the end portions 81 and 83 are engaged with each other are tightened. Eventually, the first lower unit 43, the second lower unit 45, the first upper unit 42, and the second upper unit 44 are tightened together.

Accordingly, the first upper unit 42 and the second upper unit 44 according to the present invention are firmly fixed to the first lower unit 43 and the second lower unit 45.

Figure 23:
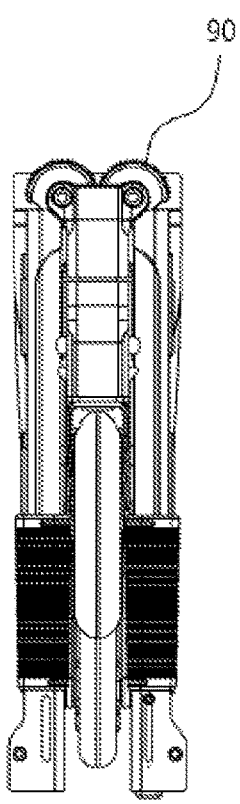
FIG. 23 is a front view of an appearance in which a foldable kick board according to a basic exemplary embodiment of the present invention is folded.
Figure 24:
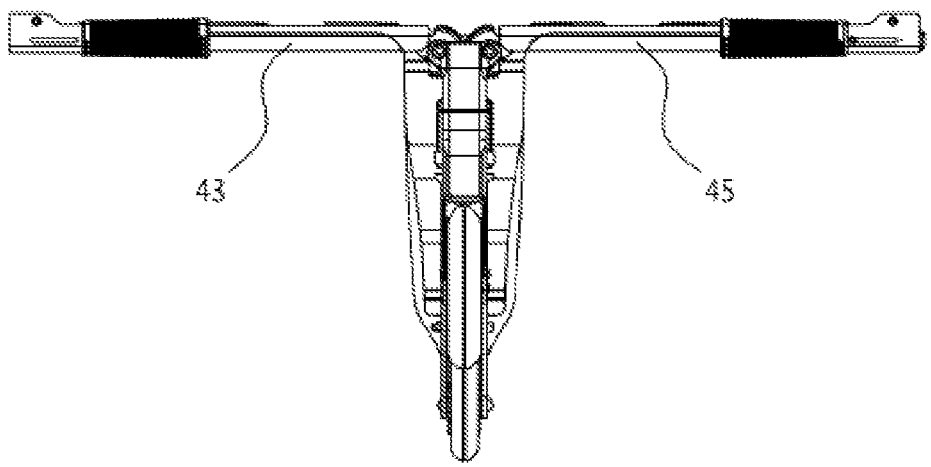
FIG. 24 is a front view of an appearance in which the first and second lower units are unfolded in the foldable kick board according to the basic exemplary embodiment of the present invention.
Figure 25:
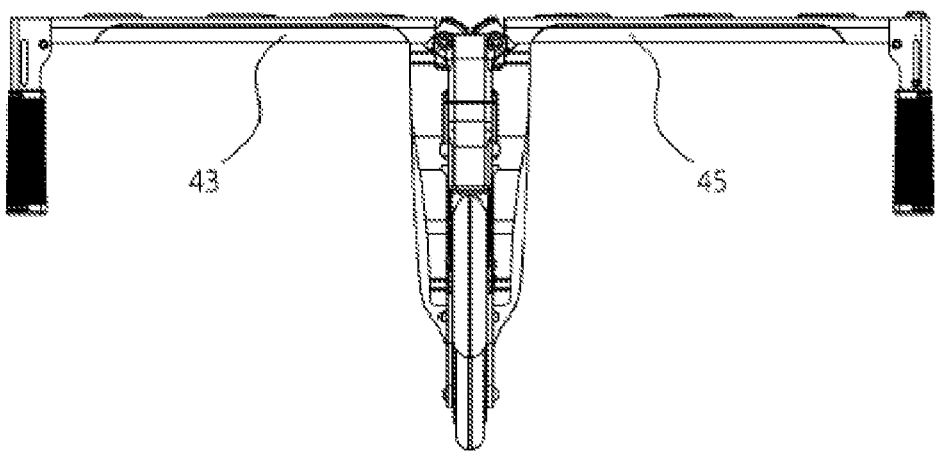
FIG. 25 is a front view of an appearance in which two handle portions are folded in the foldable kick board according to the basic exemplary embodiment of the present invention.
Figure 26:
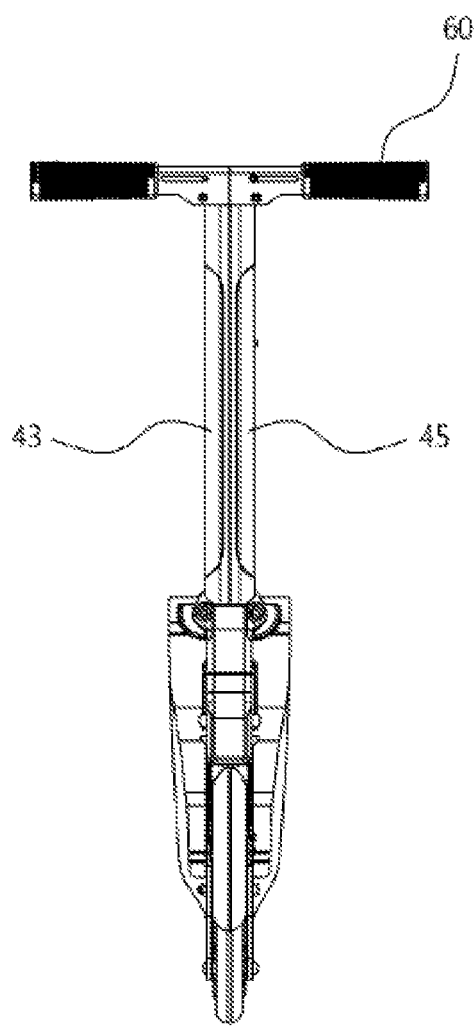
FIG. 26 is a front view of an appearance in which the first and second lower units are coupled to each other in the foldable kick board according to the basic exemplary embodiment of the present invention.
Figure 27:
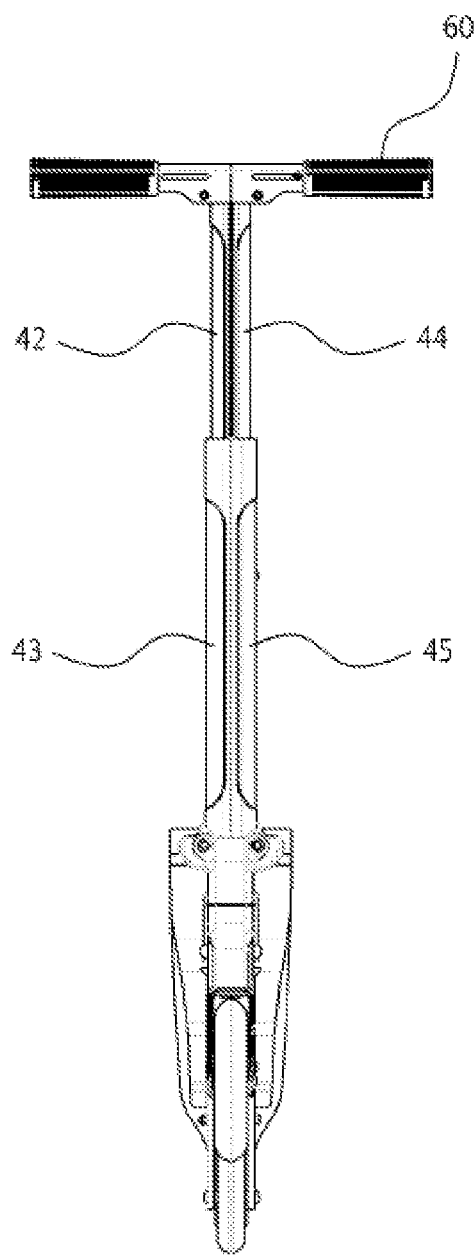
FIG. 27 is a front view of an appearance in which first and second upper units slide upward and ascend in the foldable kick board according to the basic exemplary embodiment of the present invention.

FIG. 23 is a front view of an appearance in which a foldable kick board according to a basic exemplary embodiment of the present invention is folded. FIG. 24 is a front view of an appearance in which the first and second lower units are unfolded in the foldable kick board according to the basic exemplary embodiment of the present invention. FIG. 25 is a front view of an appearance in which two handle portions are folded in the foldable kick board according to the basic exemplary embodiment of the present invention. FIG. 26 is a front view of an appearance in which the first and second lower units are coupled to each other in the foldable kick board according to the basic exemplary embodiment of the present invention. FIG. 27 is a front view of an appearance in which first and second upper units slide upward and ascend in the foldable kick board according to the basic exemplary embodiment of the present invention.

Referring to FIGS. 23 to 27, a handle shaft portion 40 of a foldable kick board according to a basic exemplary embodiment of the present invention is constituted so that the first lower unit 43 and the second lower unit 45 have gears 90 at lower ends thereof to be rotated with respect to the body portion 30.

In addition, the first upper unit 42 and the second upper unit 44 are constituted to be discharged while sliding upward in a state where the first lower unit 43 and the second lower unit 45 which are folded are unfolded and coupled to each other.

Figure 28:
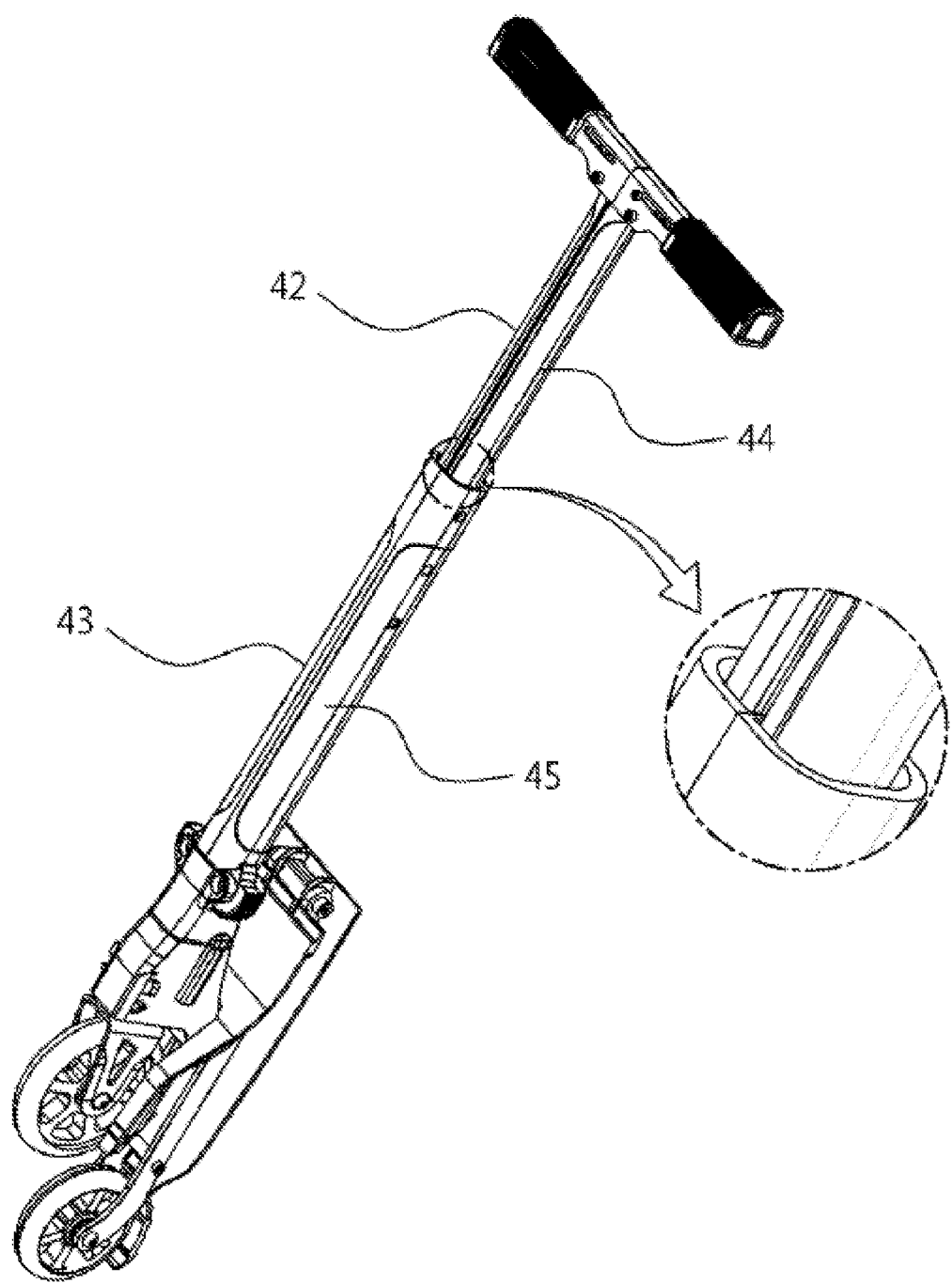
FIG. 28 is a perspective view of an appearance in which the first and second upper units slide upward and ascend in the foldable kick board according to the basic exemplary embodiment of the present invention.

FIG. 28 is a perspective view of an appearance in which the first and second upper units slide upward and ascend in the foldable kick board according to the basic exemplary embodiment of the present invention.

Referring to FIG. 28, the first upper unit 42 is fitted into the first lower unit 43 and may move vertically by sliding, and in addition, the second upper unit 44 is fitted into the second lower unit 45 and may move vertically by sliding in the same manner.

Figure 29:
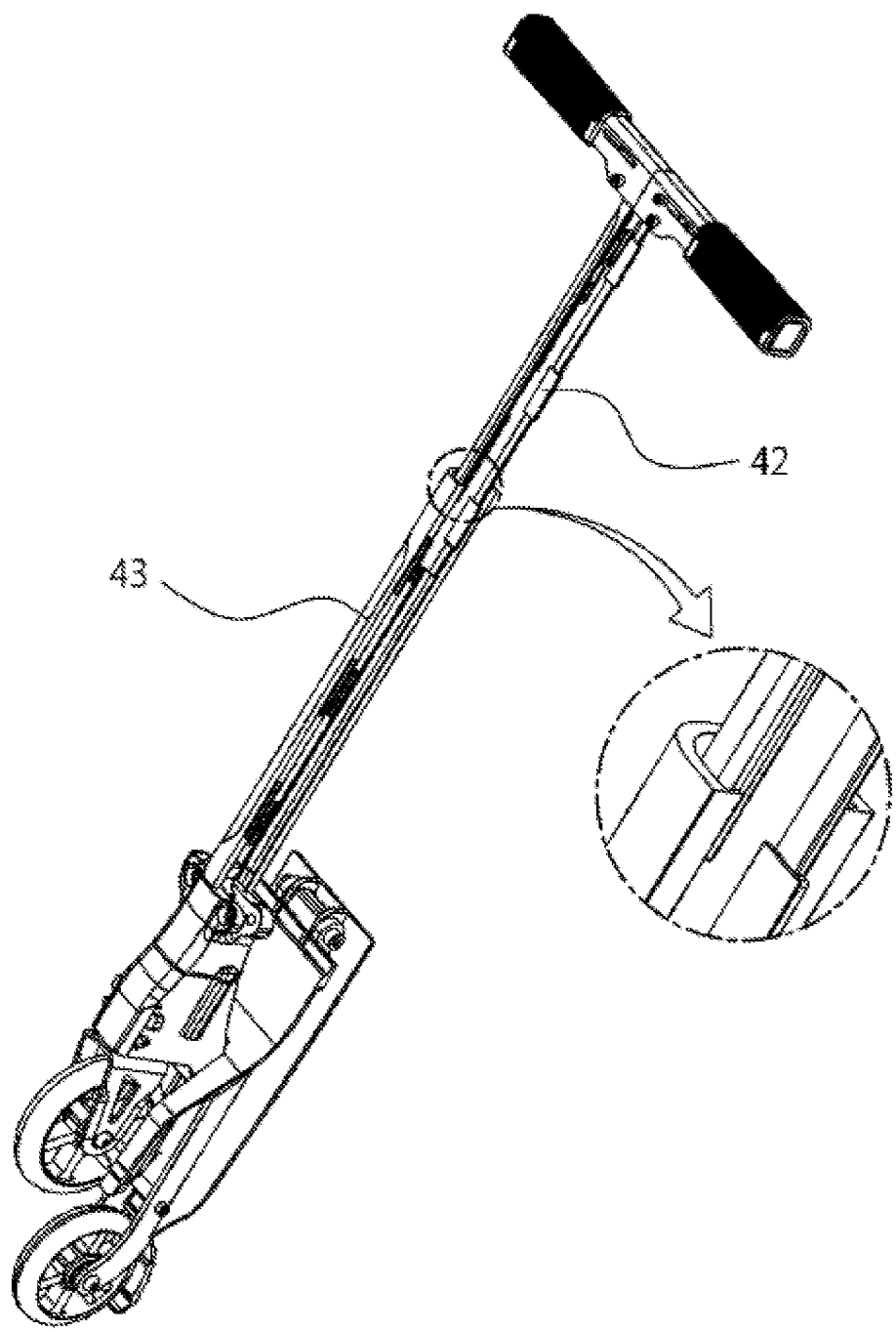
FIG. 29 is a perspective view of an appearance in which the first upper unit and the first lower unit slide and ascend in the foldable kick board according to the basic exemplary embodiment of the present invention.
Figure 30:
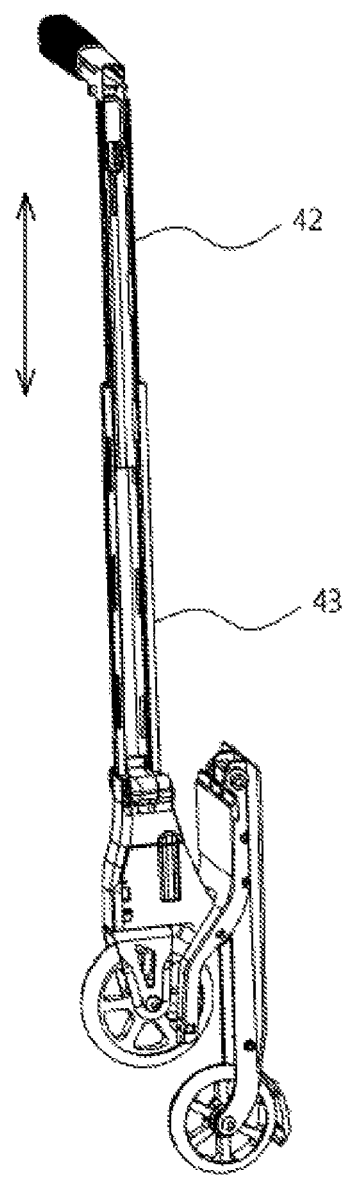
FIG. 30 is another perspective view of an appearance in which the first upper unit and the first lower unit slide and ascend in the foldable kick board according to the basic exemplary embodiment of the present invention.
Figure 31:
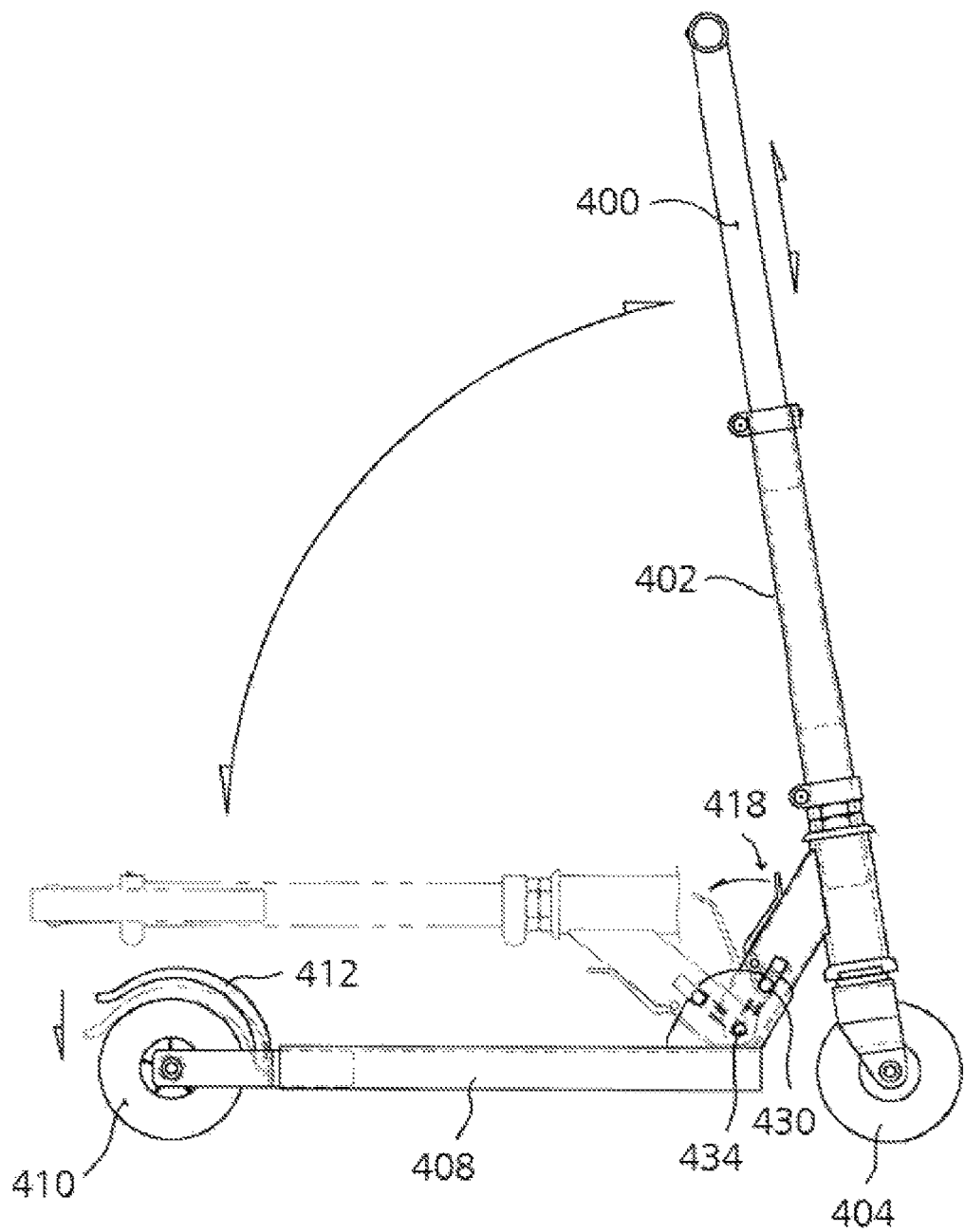
FIG. 31 is a diagram illustrating a foldable kick board in the related art.

FIG. 29 is a perspective view of an appearance in which the first upper unit and the first lower unit slide and ascend in the foldable kick board according to the basic exemplary embodiment of the present invention. FIG. 30 is another perspective view of an appearance in which the first upper unit and the first lower unit slide and ascend in the foldable kick board according to the basic exemplary embodiment of the present invention.

Referring to FIGS. 29 and 30, the first upper unit 42 is fitted into the first lower unit 43 to slide vertically.

INDUSTRIAL APPLICABILITY

While the preferred exemplary embodiments of the present invention have been described above using specific terms, such description is for illustrative purposes only and it will be apparent that various changes and modifications may be made without departing from the spirit and scope of the appended claims. Such modified exemplary embodiments should not to be understood individually from the spirit and scope of the present invention, but should be within the scope of the appended claims of the present invention.

The invention claimed is:

1. A foldable kick board in which a handle shaft portion for holding a handle portion is folded while a user places a foot on a footboard portion, wherein the handle shaft portion is folded in two stages,
   wherein the handle shaft portion includes a first lower unit and a second lower unit configured to rotate while one ends thereof are connected to each other; and a first upper unit and a second upper unit which are inserted into the first lower unit and the second lower unit to slide, respectively.

2. The foldable kick board of claim 1, wherein the footboard portion is configured by a foot front and a footboard which are connected to each other so that connected portions may rotate, a pair of locking portions provided to be fixed with a locking protrusion is provided at a lower portion of the footboard, and when a gap between the pair of locking portions is decreased, the locking protrusion inserted into a locking hole of the foot front deviates from the locking protrusion.

3. The foldable kick board of claim 1, wherein a first locking band and a second locking band which are separated from each other are provided at upper sides of the first lower unit and the second lower unit, when all of the first upper unit and the second upper unit are slidably inserted into the first lower unit and the second lower unit, the first locking band and the second locking band are separated from each other so that height positions thereof are different from each other such that hook-shaped end portions are not engaged with each other, and when the all of the first upper unit and the second upper unit are slidably discharged to the outsides of the first lower unit and the second lower unit, the height positions of the first locking band and the second locking band are the same as each other such that the hook-shaped end portions are engaged with each other.

4. A foldable kick board comprising:
   a footboard on which a user's foot is placed;
   a body portion provided with a front wheel and connected with the footboard;
   a handle shaft portion connected with the body portion; and a handle portion configured at an upper end of the handle shaft portion to be held by both hands of the user,
   wherein the handle shaft portion includes a first lower unit and a second lower unit configured to rotate while one ends thereof are connected to each other; and a first upper unit and a second upper unit which are inserted into the first lower unit and the second lower unit to slide in a vertical direction, respectively.

5. The foldable kick board of claim 4, wherein a first locking band and a second locking band which are separated from each other are provided at upper sides of the first lower unit and the second lower unit, when all of the first upper unit and the second upper unit are slidably inserted into the first lower unit and the second lower unit, the first locking band and the second locking band are separated from each other so that height positions are different from each other such that hook-shaped end portions are not engaged with each other, and when the all of the first upper unit and the second upper unit are slidably discharged to the outsides of the first lower unit and the second lower unit, the height positions of the first locking band and the second locking band are the same as each other such that the hook-shaped end portions are engaged with each other.

* * * * *